US011460739B2

(12) United States Patent
Mizuno et al.

(10) Patent No.: US 11,460,739 B2
(45) Date of Patent: Oct. 4, 2022

(54) DISPLAY DEVICE HAVING HOLDING CAPACITANCE LAYER

(71) Applicant: Japan Display Inc., Tokyo (JP)

(72) Inventors: Manabu Mizuno, Minato-ku (JP); Yoshihide Ohue, Minato-ku (JP); Hiroki Sugiyama, Minato-ku (JP); Kentaro Okuyama, Minato-ku (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/336,786

(22) Filed: Jun. 2, 2021

(65) Prior Publication Data
US 2021/0286220 A1 Sep. 16, 2021

Related U.S. Application Data

(63) Continuation of application No. PCT/JP2019/047524, filed on Dec. 4, 2019.

(30) Foreign Application Priority Data

Dec. 5, 2018 (JP) .............................. JP2018-228539

(51) Int. Cl.
*G02F 1/137* (2006.01)
*G02F 1/1362* (2006.01)
(Continued)

(52) U.S. Cl.
CPC .... *G02F 1/136213* (2013.01); *G02F 1/13347* (2021.01); *G02F 1/13629* (2021.01);
(Continued)

(58) Field of Classification Search
CPC ........... G02F 1/133615; G02F 1/13347; G02F 1/136213; G02F 1/136218;
(Continued)

(56) References Cited

U.S. PATENT DOCUMENTS 6,760,081 B2 * 7/2004 Takagi .............. G02F 1/134309
349/65
6,781,651 B2 * 8/2004 Song ................. G02F 1/136209
349/110
(Continued)

FOREIGN PATENT DOCUMENTS

JP 2018-021974 A 2/2018

OTHER PUBLICATIONS

International Search Report dated Jan. 28, 2020 in PCT/JP2019/047524 filed on Dec. 4, 2019 (with English Translation), 5 pages.

*Primary Examiner* — Paisley L Wilson
(74) *Attorney, Agent, or Firm* — Maier & Maier, PLLC

(57) ABSTRACT

A display device includes: an array substrate including a plurality of first light-transmitting electrodes each disposed in a corresponding one of pixels; a counter substrate including positions overlapping the first light-transmitting electrodes and provided with a second light-transmitting electrode; a liquid crystal layer including polymer-dispersed liquid crystals filled between the array substrate and the counter substrate; and at least one light source configured to emit light toward a side surface of the counter substrate. The array substrate includes, in each of the pixels, a third light-transmitting electrode that at least partially overlaps the first light-transmitting electrode in the plan view with an insulating layer interposed therebetween. An area of the third light-transmitting electrode in the pixel in a display region closer to the light source is larger than an area of the third light-transmitting electrode in the pixel in a display region farther from the light source.

12 Claims, 27 Drawing Sheets

(51) Int. Cl.
    *G02F 1/1334*     (2006.01)
    *G02F 1/13357*     (2006.01)
    *G09G 3/34*     (2006.01)
    *G09G 3/36*     (2006.01)
    *G02F 1/1333*     (2006.01)
    *G02F 1/1343*     (2006.01)
    *G02F 1/1368*     (2006.01)

(52) U.S. Cl.
    CPC .. *G02F 1/133368* (2021.01); *G02F 1/133615* (2013.01); *G02F 1/134381* (2021.01); *G02F 1/136209* (2013.01); *G02F 1/136218* (2021.01); *G09G 3/3413* (2013.01); *G09G 3/3648* (2013.01); *G09G 3/3666* (2013.01); *G02F 1/1368* (2013.01); *G02F 1/136227* (2013.01); *G02F 2201/122* (2013.01); *G09G 2320/0247* (2013.01)

(58) Field of Classification Search
    CPC ........... G02F 1/136209; G02F 1/13629; G02F 1/134381; G02F 2201/122; G09G 3/3648; G09G 3/3666
    See application file for complete search history.

(56) References Cited

U.S. PATENT DOCUMENTS

| | | | |
|---|---|---|---|
| 7,361,934 B2* | 4/2008 | Ishii | G02F 1/136209 257/59 |
| 9,678,394 B2* | 6/2017 | He | G02B 6/0065 |
| 10,018,865 B2* | 7/2018 | Lin | G02F 1/133382 |
| 10,423,024 B2* | 9/2019 | Li | G02F 1/137 |
| 2017/0269433 A1* | 9/2017 | Sugiyama | G02B 6/0031 |
| 2018/0031758 A1 | 2/2018 | Mizuno et al. | |
| 2020/0150490 A1 | 5/2020 | Mizuno et al. | |

* cited by examiner

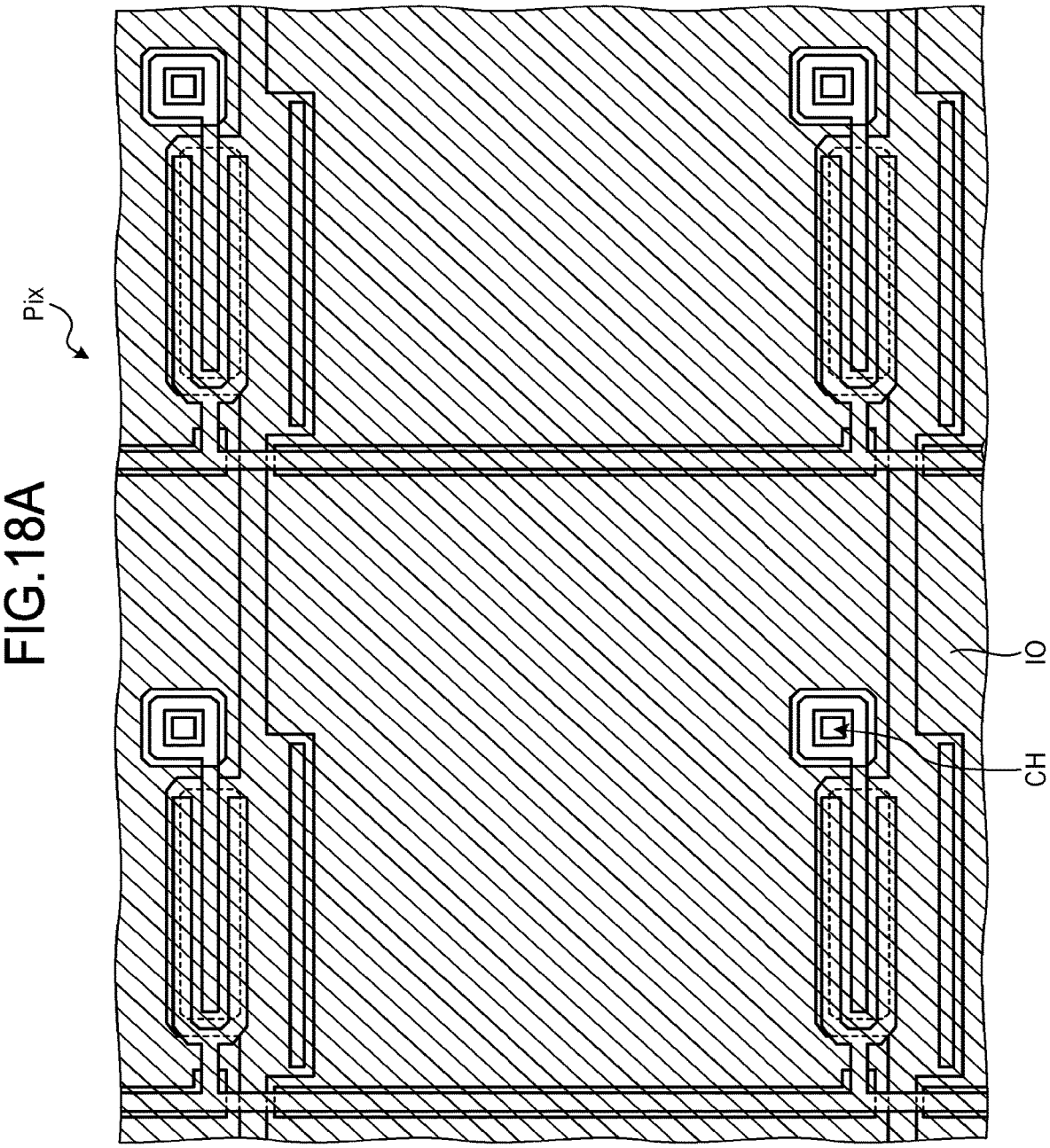

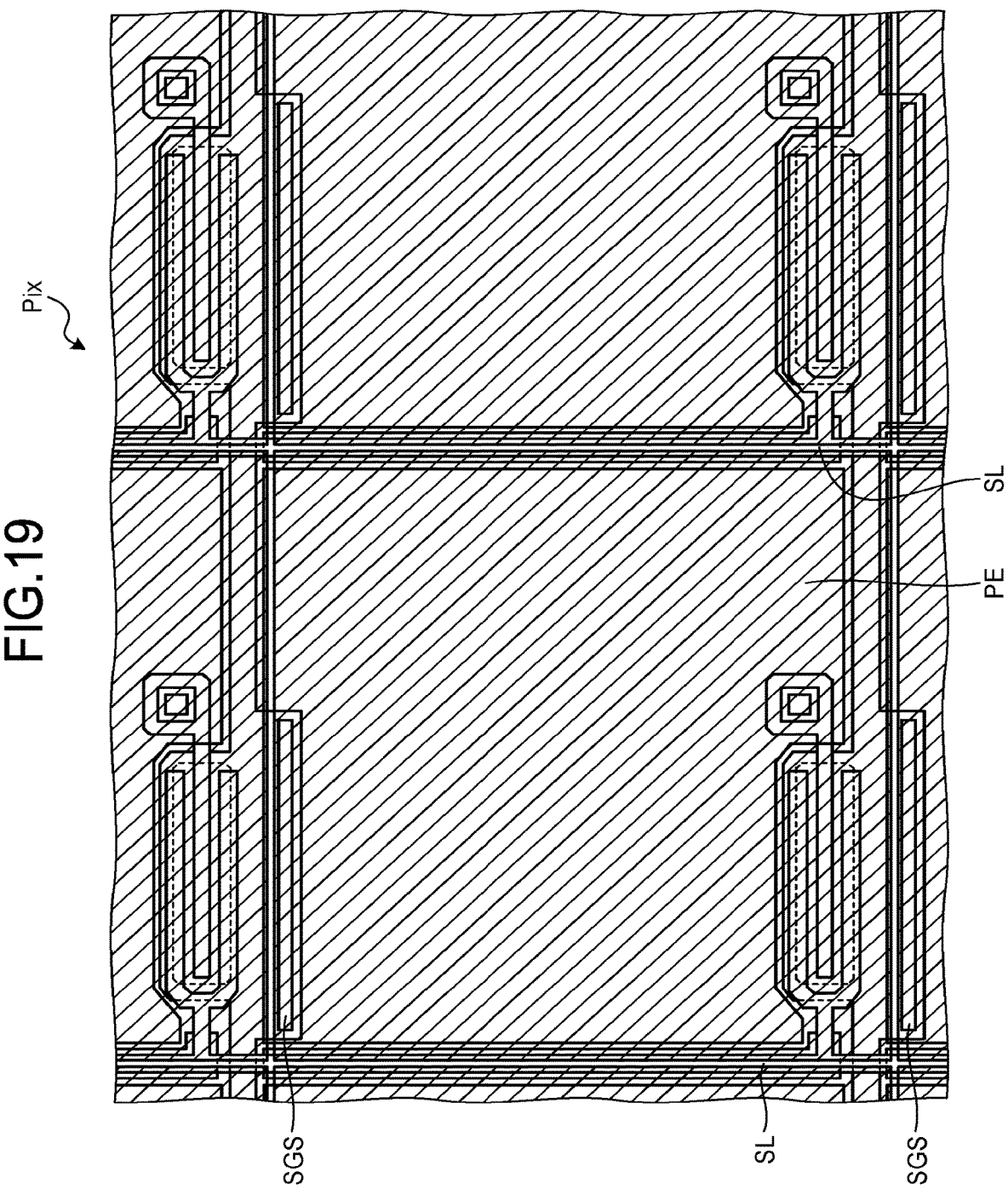

DISPLAY DEVICE HAVING HOLDING CAPACITANCE LAYER

CROSS-REFERENCE TO RELATED APPLICATION

This application claims the benefit of priority from Japanese Patent Application No. 2018-228539 filed on Dec. 5, 2018 and International Patent Application No. PCT/JP2019/047524 filed on Dec. 4, 2019, the entire contents of which are incorporated herein by reference.

BACKGROUND

1. Technical Field

What is disclosed herein relates to a display device.

2. Description of the Related Art

Japanese Patent Application Laid-open Publication No. 2018-021974 (JP-A-2018-021974) describes a display device including a first light-transmitting substrate, a second light-transmitting substrate disposed so as to be opposed to the first light-transmitting substrate, a liquid crystal layer including polymer-dispersed liquid crystals filled between the first light-transmitting substrate and the second light-transmitting substrate, and at least one light emitter disposed so as to be opposed to at least one of side surfaces of the first light-transmitting substrate and the second light-transmitting substrate.

The display device described in JP-A-2018-021974 is driven by what is called a field-sequential system using a sidelight light source device. The display device described in JP-A-2018-021974 is required to further reduce degradation in display quality such as occurrence of flickers.

For the foregoing reasons, there is a need for a display device that is driven by the field-sequential system and is capable of improving visibility of images displayed on a display panel.

SUMMARY

A display device according to an aspect includes: an array substrate including a plurality of first light-transmitting electrodes each disposed in a corresponding one of pixels; a counter substrate including positions that overlap the first light-transmitting electrodes in a plan view and are provided with a second light-transmitting electrode; a liquid crystal layer including polymer-dispersed liquid crystals filled between the array substrate and the counter substrate; and at least one light source configured to emit light toward a side surface of the counter substrate. The array substrate includes, in each of the pixels, a third light-transmitting electrode that at least partially overlaps the first light-transmitting electrode in the plan view with an insulating layer interposed between the first light-transmitting electrode and the third light-transmitting electrode. An area of the third light-transmitting electrode in the pixel in a display region closer to the light source is larger than an area of the third light-transmitting electrode in the pixel in a display region farther from the light source.

BRIEF DESCRIPTION OF THE DRAWINGS

FIG. 18A is a plan view illustrating the holding capacitance layer in the pixel according to the second embodiment;

FIG. 19 is a plan view illustrating the pixel electrode in the pixel according to the second embodiment;

DETAILED DESCRIPTION

Figure 1:
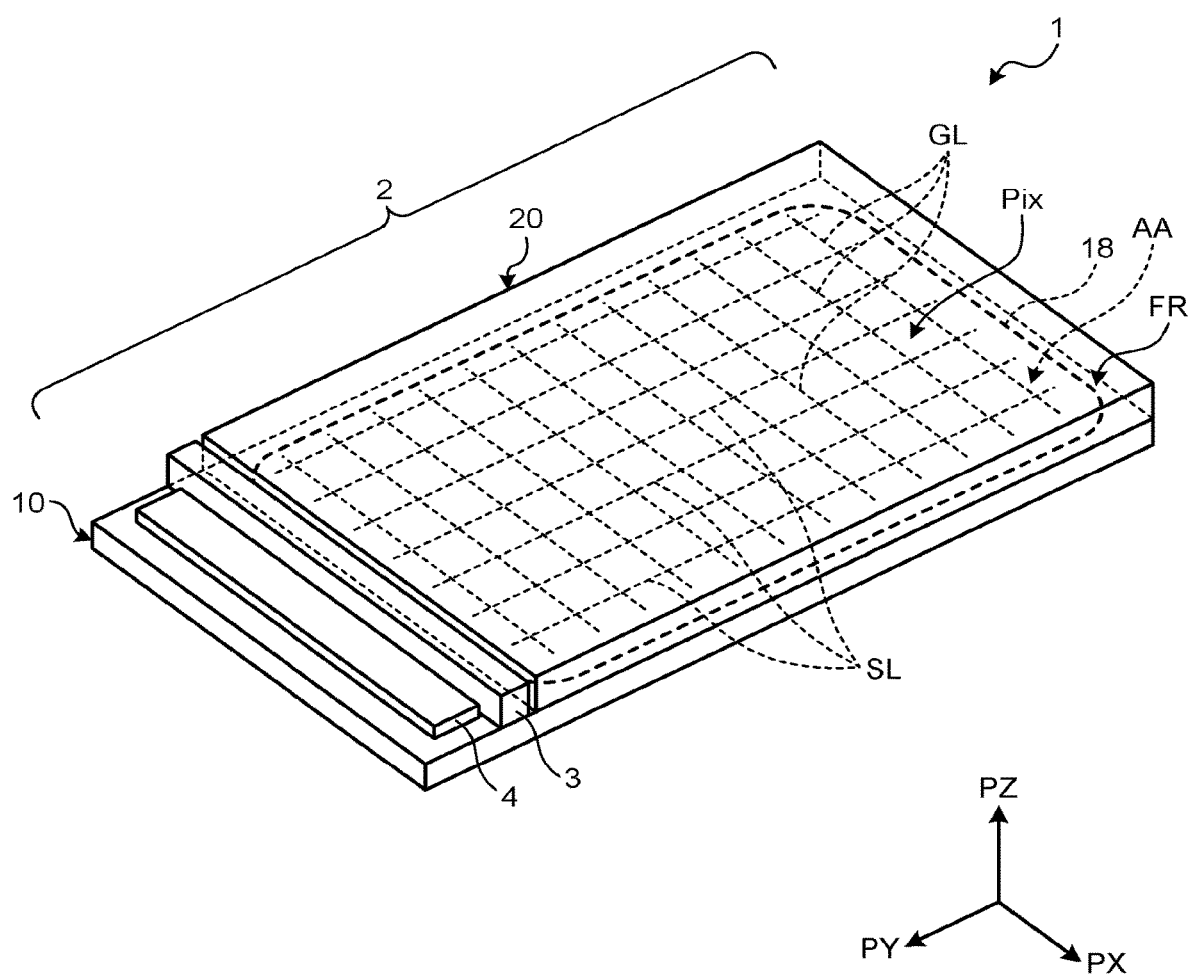
FIG. 1 is a perspective view illustrating an example of a display device according to an embodiment.

The following describes forms (embodiments) for carrying out the present disclosure in detail with reference to the drawings. The present disclosure is not limited to the description of the embodiments given below. Components described below include those easily conceivable by those skilled in the art or those substantially identical thereto. Moreover, the components described below can be appropriately combined. The disclosure is merely an example, and the present disclosure naturally encompasses appropriate modifications easily conceivable by those skilled in the art while maintaining the gist of the disclosure. To further clarify the description, widths, thicknesses, shapes, and the like of various parts are schematically illustrated in the drawings as compared with actual aspects thereof, in some cases. However, they are merely examples, and interpretation of the present disclosure is not limited thereto. The same element as that illustrated in a drawing that has already been discussed is denoted by the same reference numeral through the description and the drawings, and detailed description thereof will not be repeated in some cases where appropriate.

In this disclosure, when an element is described as being "on" another element, the element can be directly on the other element, or there can be one or more elements between the element and the other element.

First Embodiment

Figure 2:
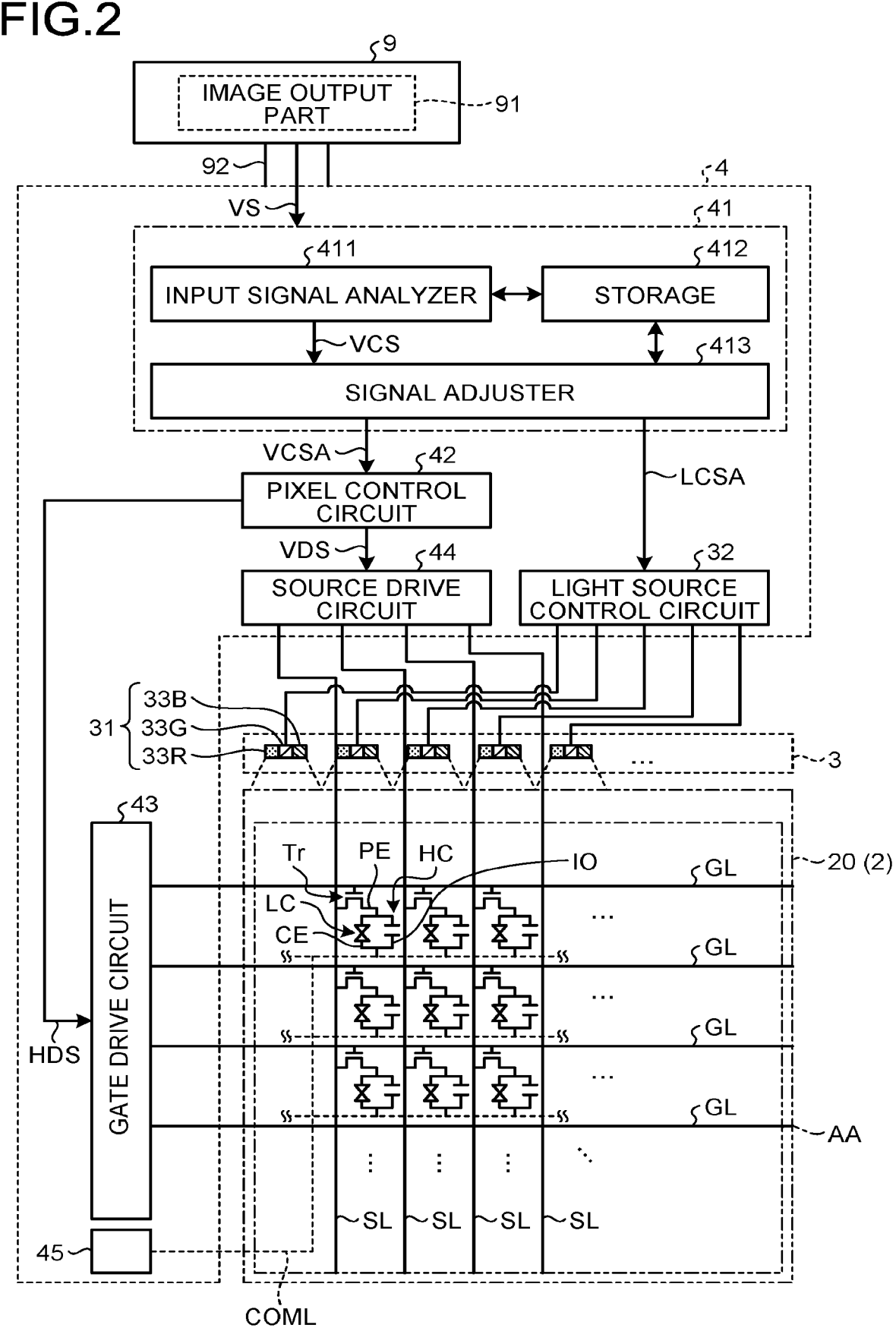
FIG. 2 is a block diagram illustrating the display device according to a first embodiment.
Figure 3:
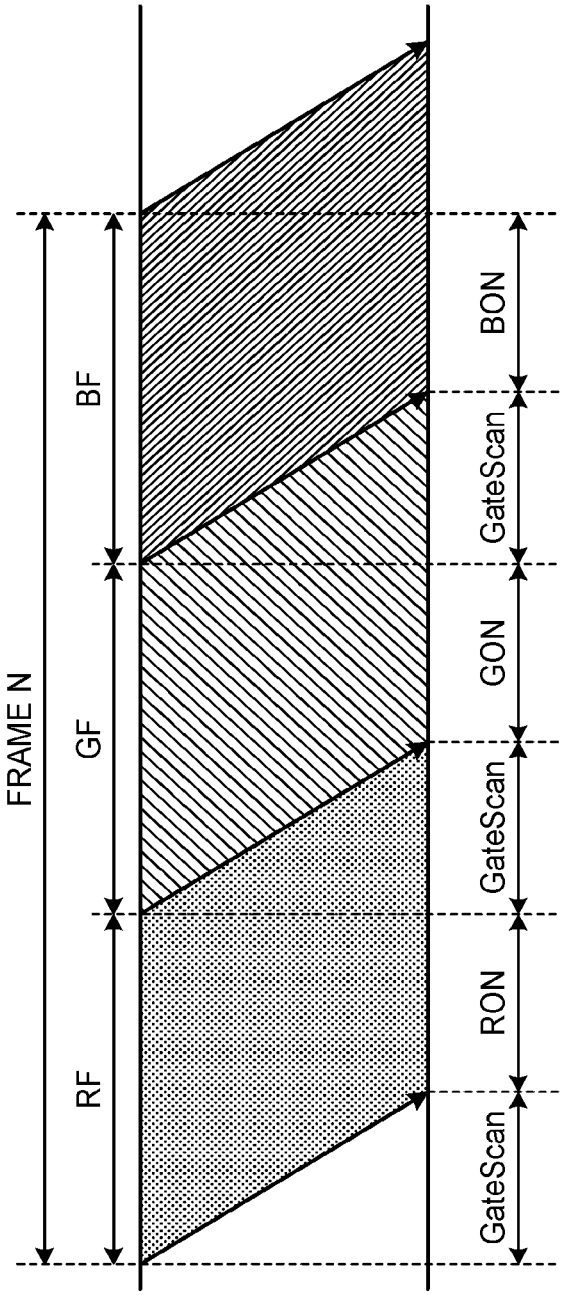
FIG. 3 is a timing diagram explaining timing of light emission by a light source in a field-sequential system according to the first embodiment.

FIG. 1 is a perspective view illustrating an example of a display device according to the present embodiment. FIG. 2 is a block diagram illustrating the display device of FIG. 1. FIG. 3 is a timing diagram explaining timing of light emission by a light source in a field-sequential system.

As illustrated in FIG. 1, a display device 1 includes a display panel 2, a side light source 3, and a drive circuit 4. A PX direction denotes one direction on the plane of the display panel 2. A second direction PY denotes a direction orthogonal to the PX direction. A third direction PZ denotes a direction orthogonal to a PX-PY plane.

Figure 5:
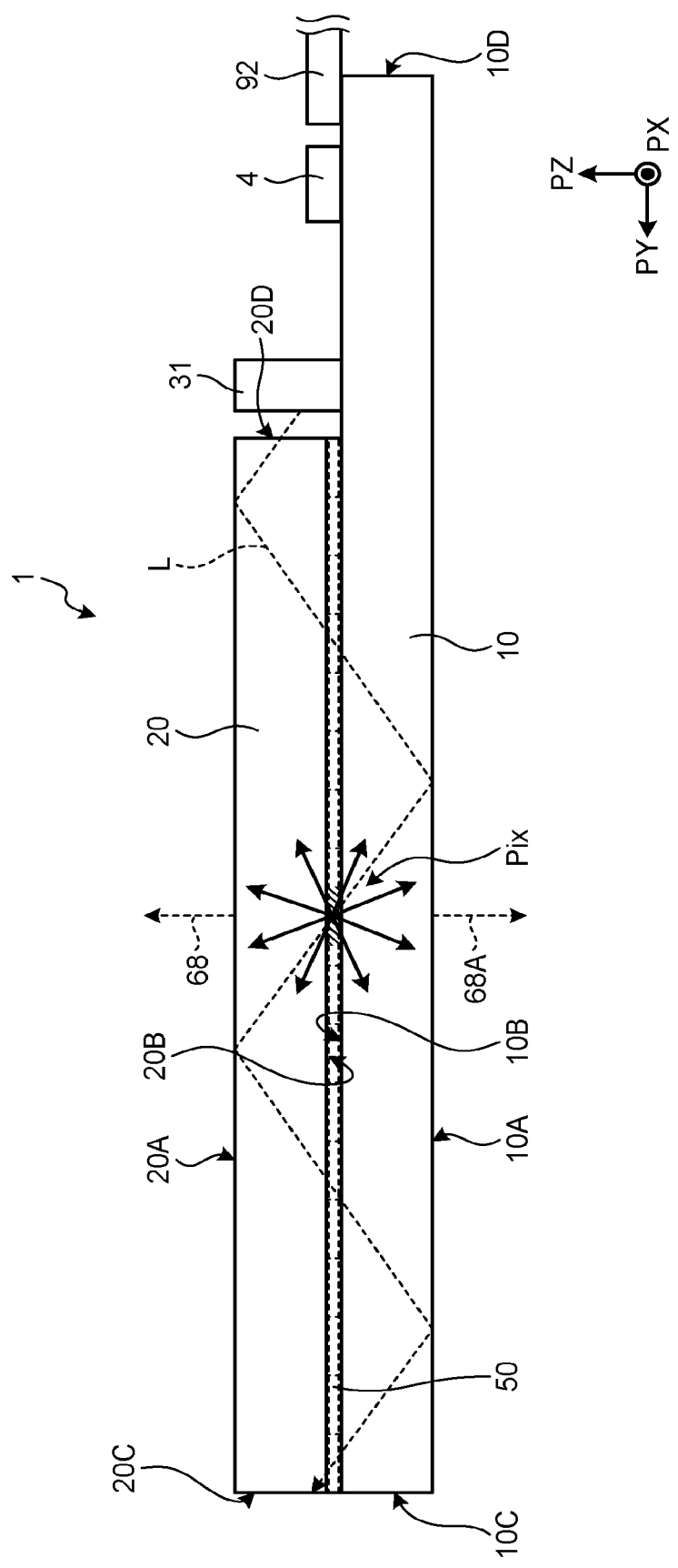
FIG. 5 is a sectional view illustrating an exemplary section of the display device of FIG. 1.

The display panel 2 includes an array substrate 10, a counter substrate 20, and a liquid crystal layer 50 (refer to FIG. 5). The counter substrate 20 is opposed to a surface of the array substrate 10 in a direction orthogonal thereto (in the PZ direction in FIG. 1). Polymer dispersed liquid crystals LC (to be described later) are sealed in the liquid crystal layer 50 (refer to FIG. 5) by the array substrate 10, the counter substrate 20, and a sealing part 18.

As illustrated in FIG. 1, the display panel 2 has a display region AA capable of displaying images and a peripheral region FR outside the display region AA. A plurality of pixels Pix are arranged in a matrix having a row-column configuration in the display region AA. In the present disclosure, a row refers to a pixel row including m pixels Pix arranged in one direction, and a column refers to a pixel column including n pixels Pix arranged in a direction orthogonal to the direction in which the rows extend. The values of m and n are defined in accordance with a display resolution in the vertical direction and a display resolution in the horizontal direction. A plurality of scanning lines GL are arranged corresponding to the rows, and a plurality of signal lines SL are arranged corresponding to the columns.

The side light source 3 includes a plurality of light emitters 31. As illustrated in FIG. 2, a light source controller (light source control circuit) 32 is included in the drive circuit 4. The light source controller 32 may be a circuit separate from the drive circuit 4. The light emitters 31 are electrically coupled to the light source controller 32 through wiring in the array substrate 10.

As illustrated in FIG. 1, the drive circuit 4 is fixed to the surface of the array substrate 10. As illustrated in FIG. 2, the drive circuit 4 includes a signal processing circuit 41, a pixel control circuit 42, a gate drive circuit 43, a source drive circuit 44, and a common potential drive circuit 45. The array substrate 10 has an area larger than that of the counter substrate 20 in an X-Y plane, and the drive circuit 4 is provided on a projecting portion of the array substrate 10 exposed from the counter substrate 20.

The signal processing circuit 41 receives an input signal (such as a red-green-blue (RGB) signal) VS from an image output part 91 of an external host controller 9 through a flexible substrate 92.

The signal processing circuit 41 includes an input signal analyzer 411, a storage 412, and a signal adjuster 413. The input signal analyzer 411 generates a second input signal VCS based on an externally received first input signal VS.

The second input signal VCS is a signal for determining a gradation value to be given to each of the pixels Pix of the display panel 2 based on the first input signal VS. In other words, the second input signal VCS is a signal including gradation information on the gradation value of each of the pixels Pix.

The signal adjuster 413 generates a third input signal VCSA from the second input signal VCS. The signal adjuster 413 transmits the third input signal VCSA to the pixel control circuit 42 and transmits a light source control signal LCSA to the light source controller 32. The light source control signal LCSA is a signal including information on light quantities of the light emitters 31 set in accordance with, for example, input gradation values given to the pixels Pix. For example, the light quantities of the light emitters 31 are set smaller when a darker image is displayed, and set larger when a brighter image is displayed.

The pixel control circuit 42 generates a horizontal drive signal HDS and a vertical drive signal VDS based on the third input signal VCSA. In the present embodiment, since the display device 1 is driven by the field-sequential system, the horizontal drive signal HDS and the vertical drive signal VDS are generated for each color emittable by the light emitter 31.

The gate drive circuit 43 sequentially selects the scanning lines GL of the display panel 2 based on the horizontal drive signal HDS during one vertical scanning period. The scanning lines GL can be selected in any order.

The source drive circuit 44 supplies a gradation signal depending on the output gradation value of each of the pixels Pix to a corresponding one of the signal lines SL of the display panel 2 based on the vertical drive signal VDS during one horizontal scanning period.

In the present embodiment, the display panel 2 is an active-matrix panel. Hence, the display panel 2 includes the signal (source) lines SL extending in the second direction PY and the scanning (gate) lines GL extending in the first direction PX in a plan view, and includes switching elements Tr at intersecting portions between the signal lines SL and the scanning lines GL.

A thin-film transistor is used as each of the switching elements Tr. A bottom-gate transistor or a top-gate transistor may be used as an example of the thin-film transistor. Although a single-gate thin film transistor is exemplified as the switching element Tr, the switching element Tr may be a double-gate transistor. One of the source electrode and the drain electrode of the switching element Tr is coupled to a corresponding one of the signal lines SL, and the gate electrode of the switching element Tr is coupled to a corresponding one of the scanning lines GL. The other of the source electrode and the drain electrode is coupled to one end of a capacitance (to be described later) of the polymer-dispersed liquid crystal LC. The capacitance of the polymer-dispersed liquid crystal LC is coupled at one end thereof to the switching element Tr through a pixel electrode PE, and coupled at the other end thereof to common potential wiring COML through a common electrode CE. A holding capacitance HC is formed between the pixel electrode PE and a holding capacitance electrode IO electrically coupled to the common potential wiring COML. A potential of the common potential wiring COML is supplied by the common potential drive circuit 45.

Each of the light emitters 31 includes a light emitter 33R of a first color (such as red), a light emitter 33G of a second color (such as green), and a light emitter 33B of a third color (such as blue). The light source controller 32 controls the light emitter 33R of the first color, the light emitter 33G of the second color, and the light emitter 33B of the third color so as to emit light in a time-division manner based on the light source control signal LCSA. In this manner, the light emitter 33R of the first color, the light emitter 33G of the second color, and the light emitter 33B of the third color are driven based on the field-sequential system.

As illustrated in FIG. 3, in a first sub-frame (first predetermined time) RF, the light emitter 33R of the first color emits light during a first color light emission period RON, and the pixels Pix selected during one vertical scanning period GateScan scatter light to perform display. On the entire display panel 2, if the gradation signal corresponding to the output gradation value of each of the pixels Pix selected during the one vertical scanning period GateScan is supplied to a corresponding one of the above-described signal lines SL, only the first color is lit up during the first color light emission period RON.

Then, in a second sub-frame (second predetermined time) GF, the light emitter 33G of the second color emits light during a second color light emission period GON, and the pixels Pix selected during the one vertical scanning period GateScan scatter light to perform display. On the entire display panel 2, if the gradation signal corresponding to the output gradation value of each of the pixels Pix selected during the one vertical scanning period GateScan is supplied to a corresponding one of the above-described signal lines SL, only the second color is lit up during the second color light emission period GON.

Further, in a third sub-frame (third predetermined time) BF, the light emitter 33B of the third color emits light during a third color light emission period BON, and the pixels Pix selected during the one vertical scanning period GateScan scatter light to perform display. On the entire display panel 2, if the gradation signal corresponding to the output gradation value of each of the pixels Pix selected during the one vertical scanning period GateScan is supplied to a corresponding one of the above-described signal lines SL, only the third color is lit up during the third color light emission period BON.

Since a human eye has limited temporal resolving power and produces an afterimage, an image with a combination of three colors is recognized in a period of one frame (1F). The field-sequential system can eliminate the need for a color filter, and thus can reduce an absorption loss by the color filter. As a result, higher transmittance can be obtained. In the color filter system, one pixel is made up of sub-pixels obtained by dividing each of the pixels Pix into the sub-pixels of the first color, the second color, and the third color. In contrast, in the field-sequential system, the pixel need not be divided into the sub-pixels in such a manner. A fourth sub-frame may be further included to emit light in a fourth color different from any one of the first color, the second color, and the third color.

Figure 4:
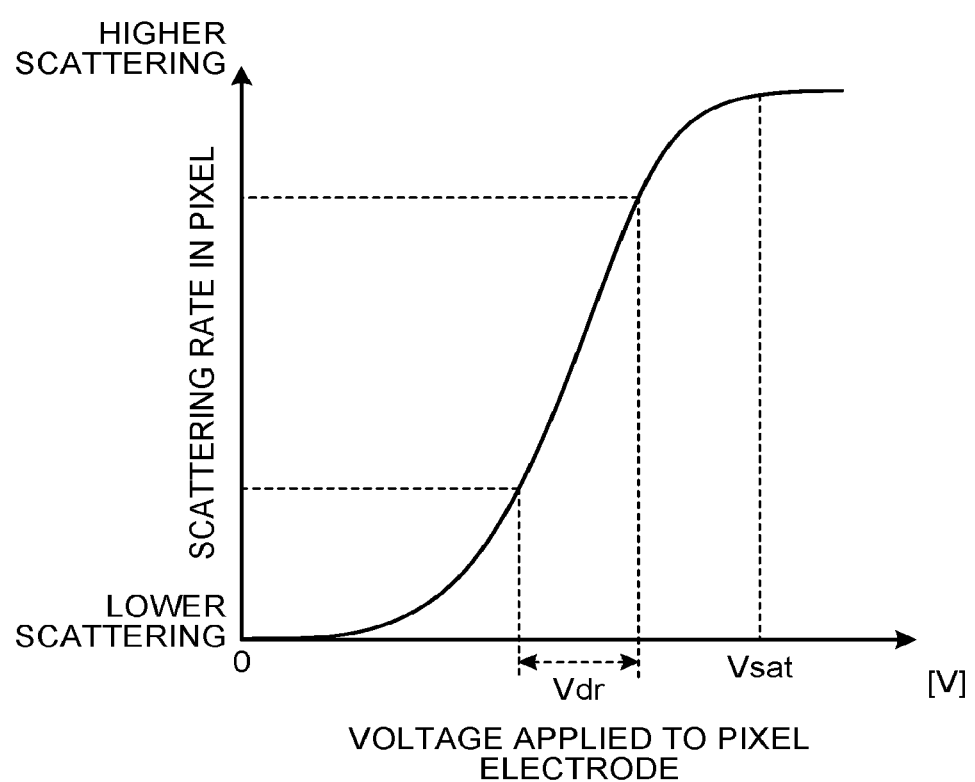
FIG. 4 is an explanatory diagram illustrating a relation between a voltage applied to a pixel electrode and a scattering state of a pixel.
Figure 6:
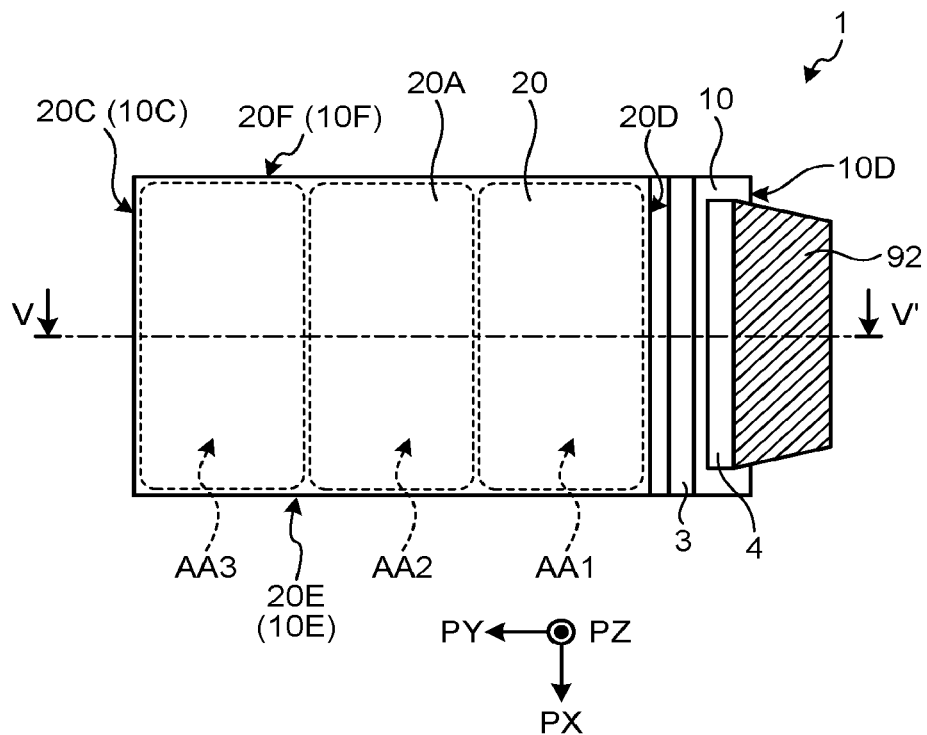
FIG. 6 is a plan view illustrating a planar surface of the display device of FIG. 1.
Figure 7:
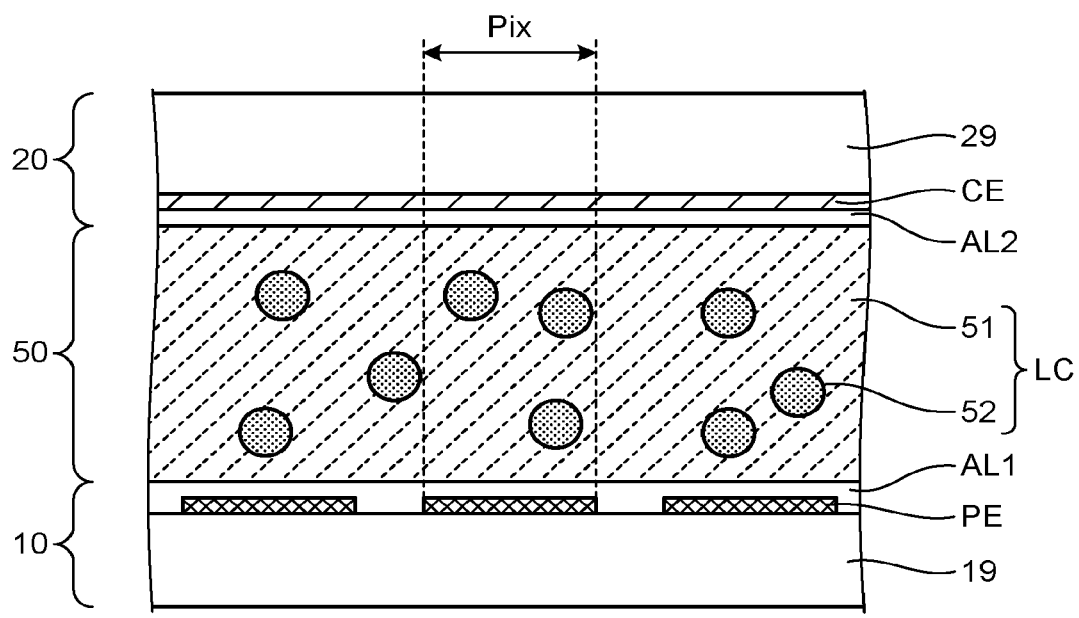
FIG. 7 is an enlarged sectional view obtained by enlarging a liquid crystal layer portion of FIG. 5.
Figure 8:
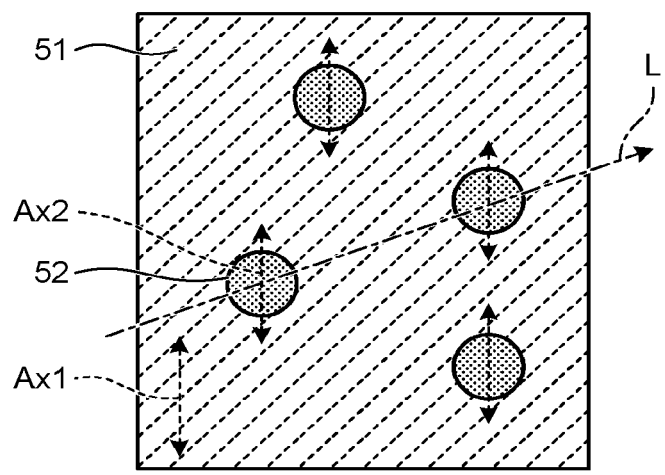
FIG. 8 is a sectional view for explaining a non-scattering state in the liquid crystal layer.
Figure 9:
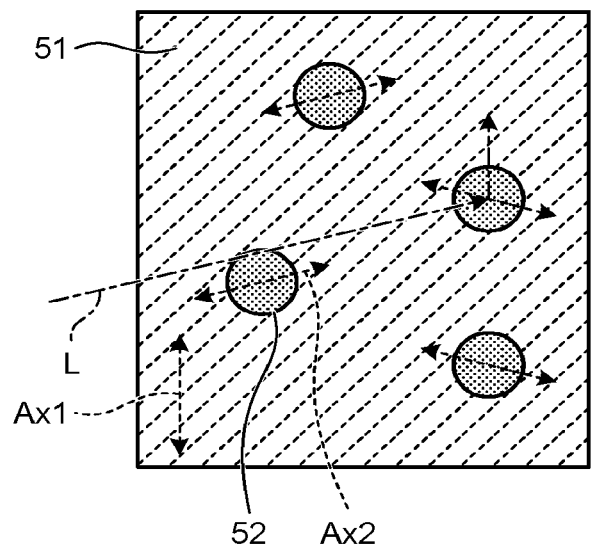
FIG. 9 is a sectional view for explaining the scattering state in the liquid crystal layer.

FIG. 4 is an explanatory diagram illustrating a relation between a voltage applied to the pixel electrode and the scattering state of the pixel. FIG. 5 is a sectional view illustrating an exemplary section of the display device of FIG. 1. FIG. 6 is a plan view illustrating a planar surface of the display device of FIG. 1. FIG. 5 illustrates a V-V' section of FIG. 6. FIG. 7 is an enlarged sectional view obtained by enlarging the liquid crystal layer portion of FIG. 5. FIG. 8 is a sectional view for explaining a non-scattering state in the liquid crystal layer. FIG. 9 is a sectional view for explaining the scattering state in the liquid crystal layer.

If the gradation signal depending on the output gradation value of each of the pixels Pix is supplied to the above-described signal lines SL for the pixels Pix selected during one vertical scanning period GateScan, a voltage applied to the pixel electrode PE changes with the gradation signal. The change in the voltage applied to the pixel electrode PE changes the voltage between the pixel electrode PE and the common electrode CE. The scattering state of the liquid crystal layer 50 for each of the pixels Pix is controlled in accordance with the voltage applied to the pixel electrode PE, and, as illustrated in FIG. 4, the scattering rate in the pixels Pix changes.

As illustrated in FIG. 4, the change in the scattering rate in the pixel Pix is smaller when the voltage applied to the pixel electrode PE is equal to or higher than a saturation voltage Vsat. Therefore, the drive circuit 4 changes the voltage applied to the pixel electrode PE in accordance with the vertical drive signal VDS in a voltage range Vdr lower than the saturation voltage Vsat.

As illustrated in FIGS. 5 and 6, the array substrate 10 has a first principal surface 10A, a second principal surface 10B, a first side surface 10C, a second side surface 10D, a third side surface 10E, and a fourth side surface 10F. The first principal surface 10A and the second principal surface 10B are parallel surfaces. The first side surface 10C and the second side surface 10D are parallel surfaces. The third side surface 10E and the fourth side surface 10F are parallel surfaces.

As illustrated in FIGS. 5 and 6, the counter substrate 20 has a first principal surface 20A, a second principal surface 20B, a first side surface 20C, a second side surface 20D, a third side surface 20E, and a fourth side surface 20F. The first principal surface 20A and the second principal surface 20B are parallel surfaces. The first side surface 20C and the second side surface 20D are parallel surfaces. The third side surface 20E and the fourth side surface 20F are parallel surfaces.

As illustrated in FIGS. 5 and 6, the light emitters 31 are opposed to the second side surface 20D of the counter substrate 20. As illustrated in FIG. 5, the light emitters 31 emit light-source light L to the second side surface 20D of the counter substrate 20. The second side surface 20D of the counter substrate 20 opposed to the light emitters 31 serves as a surface of light incidence.

As illustrated in FIG. 5, the light-source light L emitted from the light emitter 31 propagates in a direction away from the second side surface 20D while being reflected by the first principal surface 10A of the array substrate 10 and the first principal surface 20A of the counter substrate 20. When the light-source light L travels outward from the first principal surface 10A of the array substrate 10 or the first principal surface 20A of the counter substrate 20, the light-source light L enters a medium having a lower refractive index from a medium having a higher refractive index. Hence, if the angle of incidence of the light-source light L incident on the first principal surface 10A of the array substrate 10 or the first principal surface 20A of the counter substrate 20 is larger than a critical angle, the light-source light L is fully reflected by the first principal surface 10A of the array substrate 10 or the first principal surface 20A of the counter substrate 20.

As illustrated in FIG. 5, the light-source light L that has propagated in the array substrate 10 and the counter substrate 20 is scattered by the pixels Pix including liquid crystals placed in the scattering state, and the angle of incidence of the scattered light becomes an angle smaller than the critical angle. Thus, emission light 68 or 68A is emitted outward from the first principal surface 20A of the counter substrate 20 or the first principal surface 10A of the array substrate 10. The emission light 68 or 68A emitted outward from the first principal surface 20A of the counter substrate 20 or the first principal surface 10A of the array substrate 10 is viewed by the viewer. The following describes the polymer-dispersed liquid crystals placed in the scattering state and the polymer-dispersed liquid crystals in the non-scattering state, using FIGS. 7 to 9.

As illustrated in FIG. 7, the array substrate 10 is provided with a first orientation film AL1, and the counter substrate 20 is provided with a second orientation film AL2. The first and the second orientation films AL1 and AL2 are, for example, vertical orientation films.

A solution containing the liquid crystals and a monomer is filled between the array substrate 10 and the counter substrate 20. Then, in a state where the monomer and the liquid crystals are oriented by the first and the second orientation films AL1 and AL2, the monomer is polymerized by ultraviolet rays or heat to form a bulk 51. This process forms the liquid crystal layer 50 including reverse-mode polymer-dispersed liquid crystals LC in which the liquid crystals are dispersed in gaps of a polymer network formed in a mesh shape.

In this manner, the polymer-dispersed liquid crystals LC contain the bulk 51 formed of the polymer and a plurality of fine particles 52 dispersed in the bulk 51. The fine particles 52 contain the liquid crystals. Both the bulk 51 and the fine particles 52 have optical anisotropy.

The orientation of the liquid crystals contained in the fine particles 52 is controlled by a voltage difference between the pixel electrode PE and the common electrode CE. The orientation of the liquid crystals is changed by the voltage applied to the pixel electrode PE. The degree of scattering of light passing through the pixels Pix changes with change in the orientation of the liquid crystals.

For example, as illustrated in FIG. 8, when no voltage is applied between the pixel electrode PE and the common electrode CE, the direction of an optical axis Ax1 of the bulk 51 is equal to the direction of an optical axis Ax2 of the fine particles 52. The optical axis Ax2 of the fine particles 52 is parallel to the PZ direction of the liquid crystal layer 50. The optical axis Ax1 of the bulk 51 is parallel to the PZ direction of the liquid crystal layer 50 regardless of whether a voltage is applied.

Ordinary-ray refractive indices of the bulk 51 and the fine particles 52 are equal to each other. When no voltage is applied between the pixel electrode PE and the common electrode CE, the difference of refractive index between the bulk 51 and the fine particles 52 is zero in all directions. The liquid crystal layer 50 is placed in the non-scattering state of not scattering the light-source light L. The light-source light L propagates in a direction away from the light emitter 31 while being reflected by the first principal surface 10A of the array substrate 10 and the first principal surface 20A of the counter substrate 20. When the liquid crystal layer 50 is in the non-scattering state of not scattering the light-source light L, a background on the first principal surface 20A side of the counter substrate 20 is visible from the first principal surface 10A of the array substrate 10, and a background on the first principal surface 10A side of the array substrate 10 is visible from the first principal surface 20A of the counter substrate 20.

As illustrated in FIG. 9, in the space between the pixel electrode PE having a voltage applied thereto and the common electrode CE, the optical axis Ax2 of the fine particles 52 is inclined by an electric field generated between the pixel electrode PE and the common electrode CE. Since the optical axis Ax1 of the bulk 51 is not changed by the electric field, the direction of the optical axis Ax1 of the bulk 51 differs from the direction of the optical axis Ax2 of the fine particles 52. The light-source light L is scattered in the pixel Pix including the pixel electrode PE having a voltage applied thereto. As described above, the viewer views a part of the scattered light-source light L emitted outward from the first principal surface 10A of the array substrate 10 or the first principal surface 20A of the counter substrate 20.

In the pixel Pix including the pixel electrode PE having no voltage applied thereto, the background on the first principal surface 20A side of the counter substrate 20 is visible from the first principal surface 10A of the array substrate 10, and the background on the first principal surface 10A side of the array substrate 10 is visible from the first principal surface 20A of the counter substrate 20. In the display device 1 of the present embodiment, when the first input signal VS is entered from the image output part 91, a voltage is applied to the pixel electrode PE of the pixel Pix for displaying an image, and the image based on the third input signal VCSA becomes visible together with the background.

The light-source light L is scattered in the pixel Pix including the pixel electrode PE having a voltage applied thereto, and emitted outward to display the image, which is displayed so as to be superimposed on the background. In other words, the display device 1 of the present embodiment combines the emission light 68 or the emission light 68A with the background to display the image so as to be superimposed on the background.

A potential of each of the pixel electrodes PE (refer to FIG. 7) written during the one vertical scanning period GateScan illustrated in FIG. 3 needs to be held during at least one of the first color light emission period RON, the second color light emission period GON, and the third color light emission period BON coming after the one vertical scanning period GateScan. If the written potential of each of the pixel electrodes PE (refer to FIG. 7) cannot be held during at least one of the first color light emission period RON, the second color light emission period GON, and the third color light emission period BON coming after the one vertical scanning period GateScan, what are called flickers are likely to occur. In other words, in order to shorten the one vertical scanning period GateScan serving as a time for selecting the scanning lines and increase the visibility in the driving using what is called the field-sequential system, the written potential of each of the pixel electrodes PE (refer to FIG. 7) is required to be easily held during each of the first color light emission period RON, the second color light emission period GON, and the third color light emission period BON.

Figure 10:
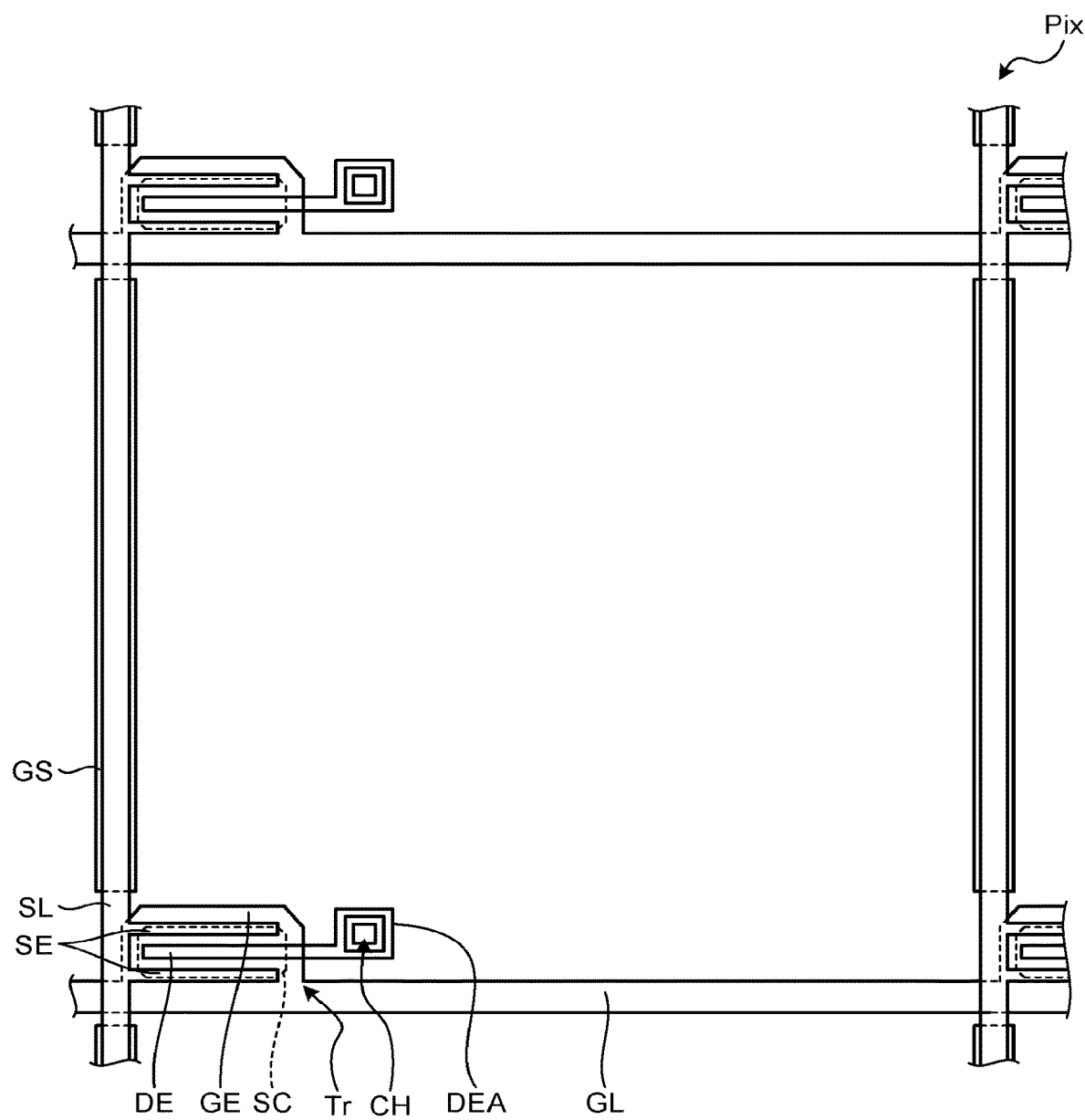
FIG. 10 is a plan view illustrating a scanning line, a signal line, and a switching element in the pixel.
Figure 11A:
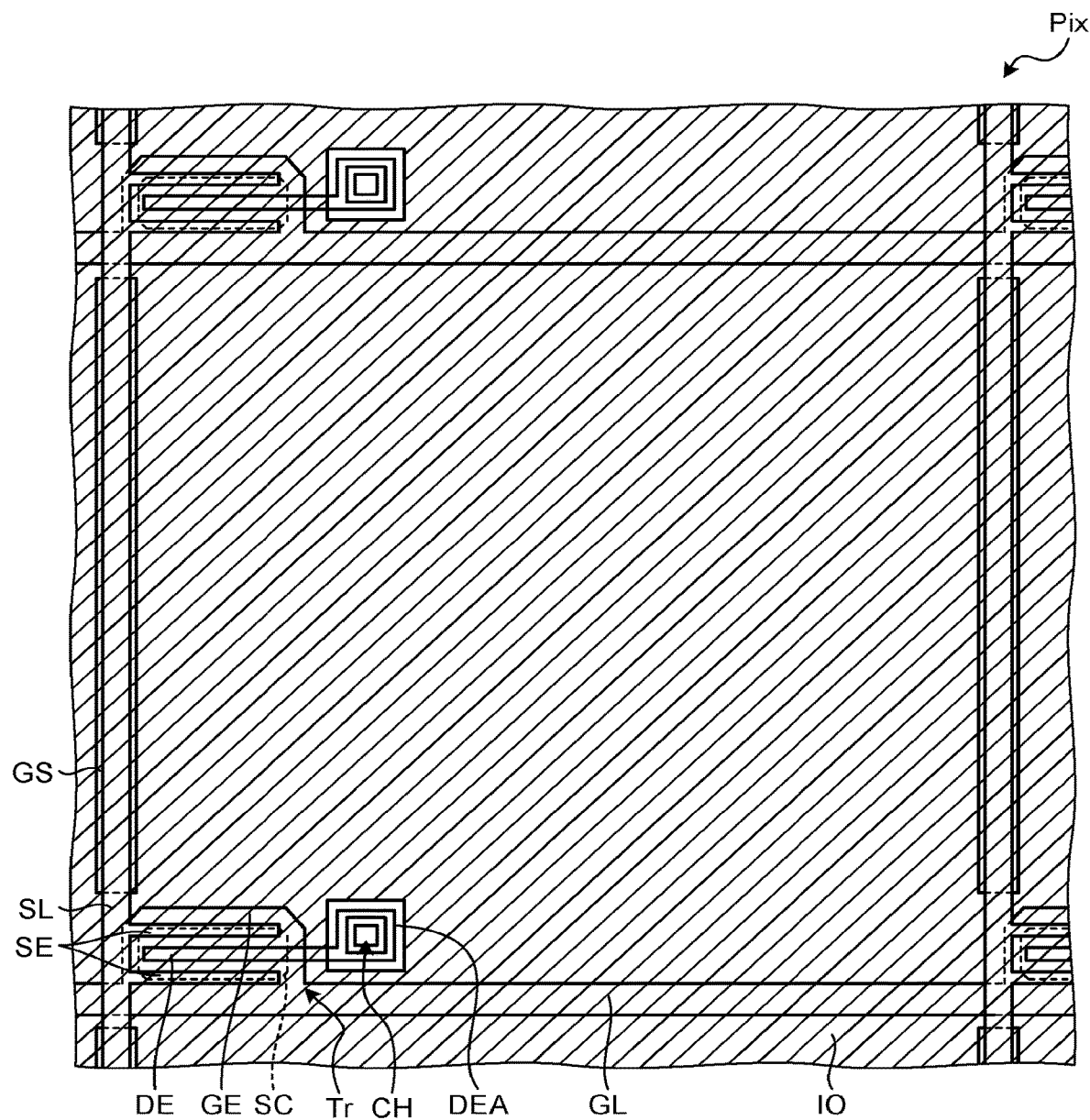
FIG. 11A is a plan view illustrating a holding capacitance layer in the pixel.
Figure 11B:
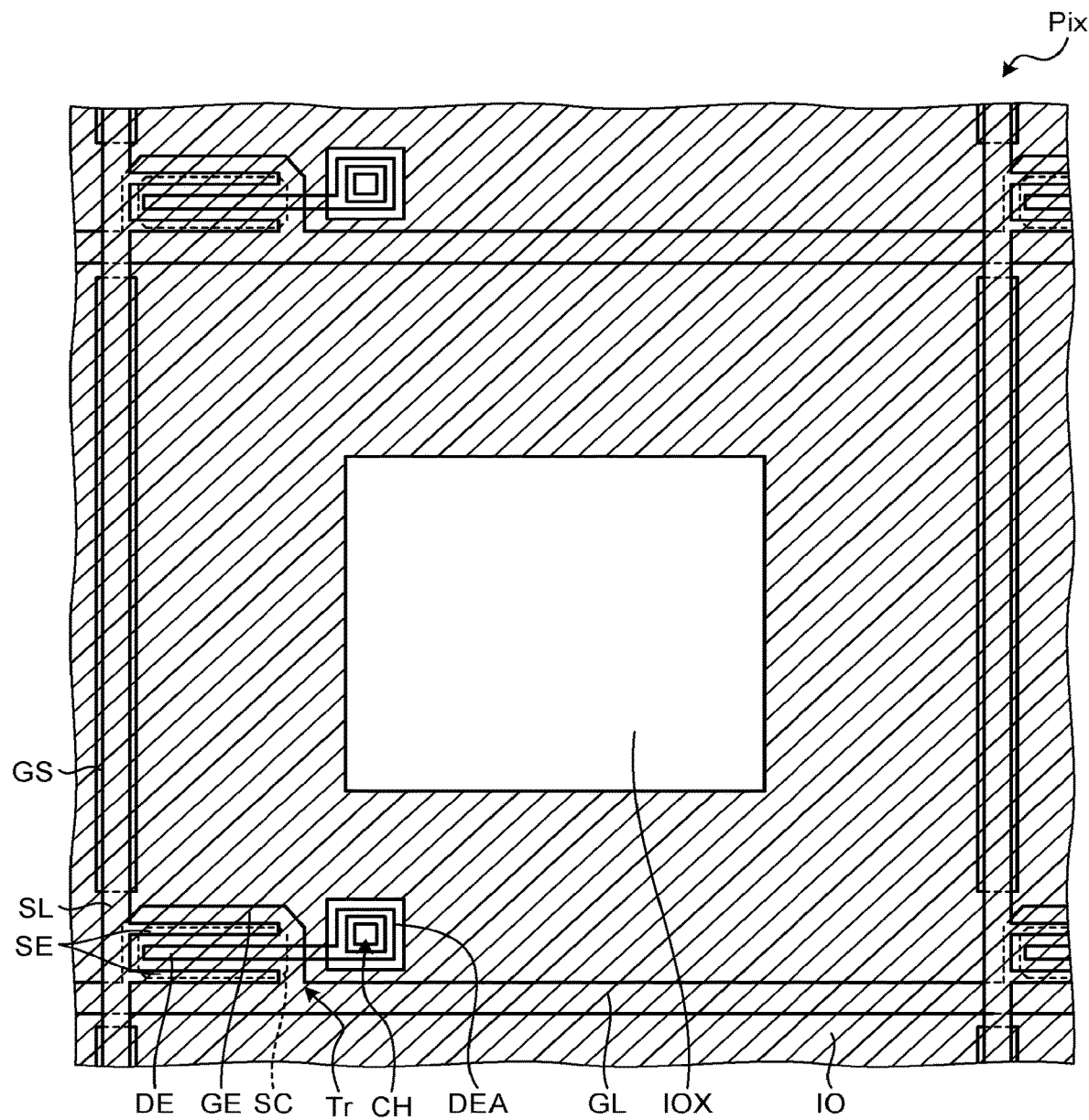
FIG. 11B is a plan view illustrating the holding capacitance layer in the pixel.
Figure 11C:
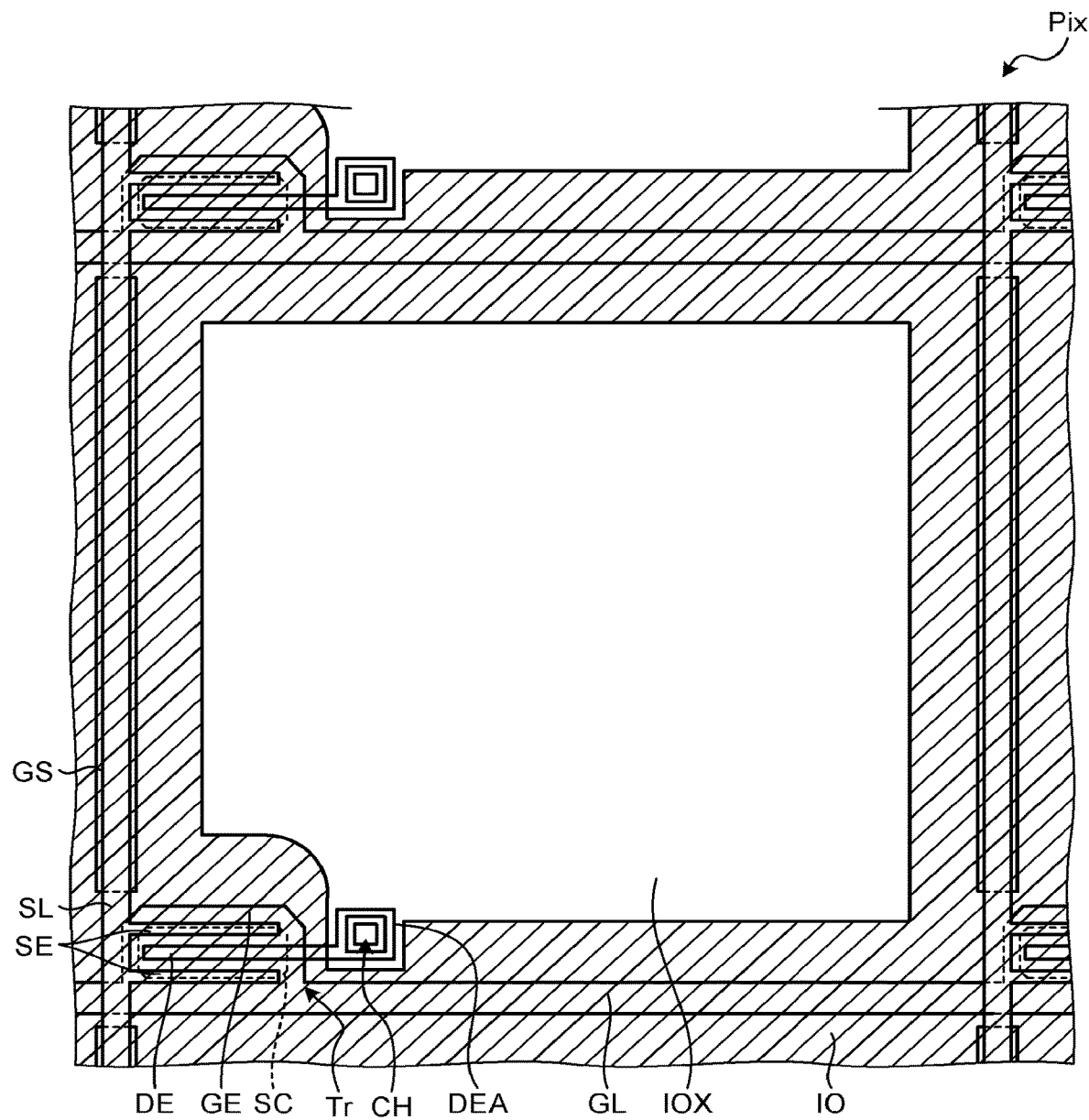
FIG. 11C is a plan view illustrating the holding capacitance layer in the pixel.
Figure 12:
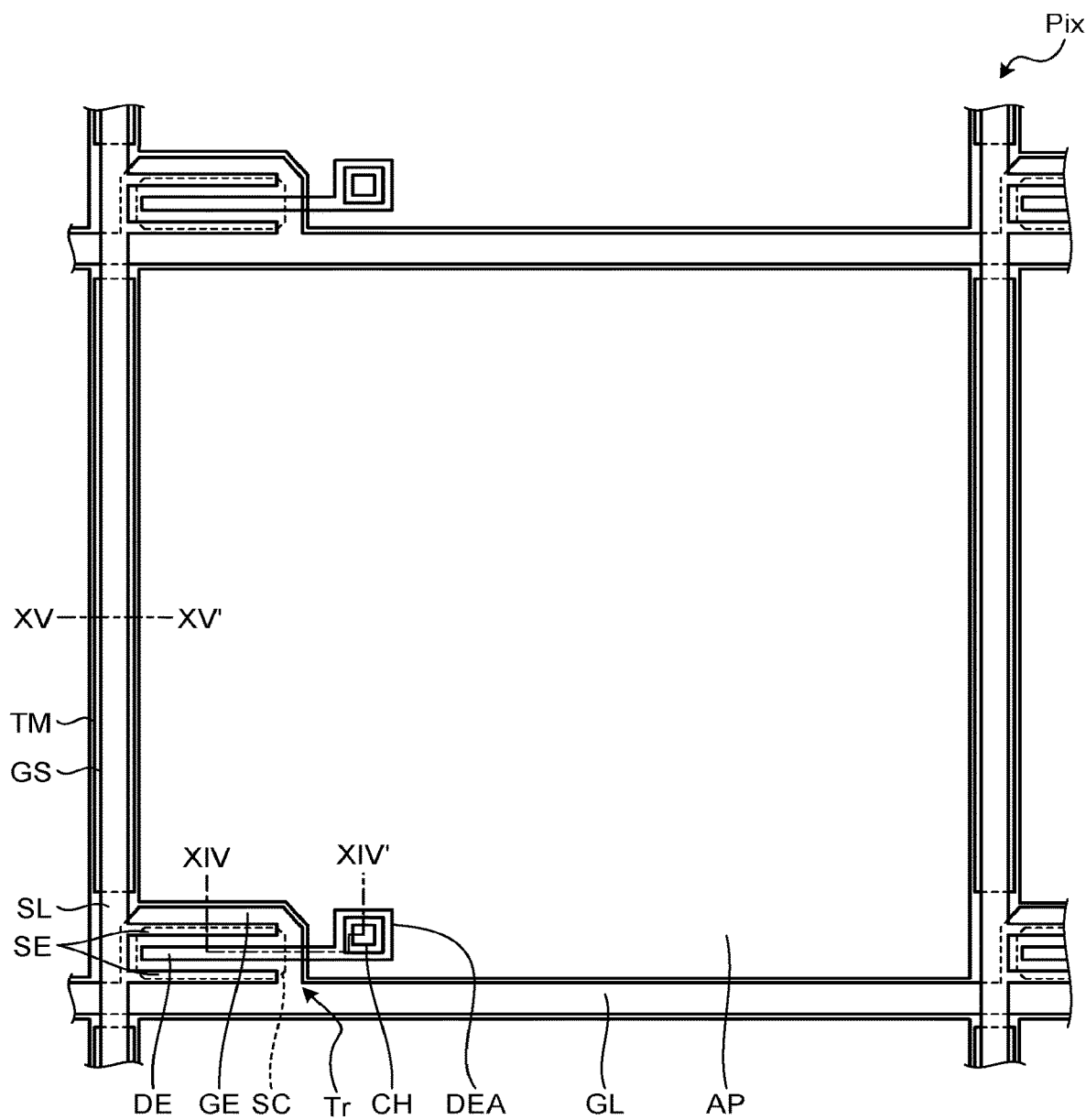
FIG. 12 is a plan view illustrating an auxiliary metal layer and an opening region in the pixel.
Figure 13:
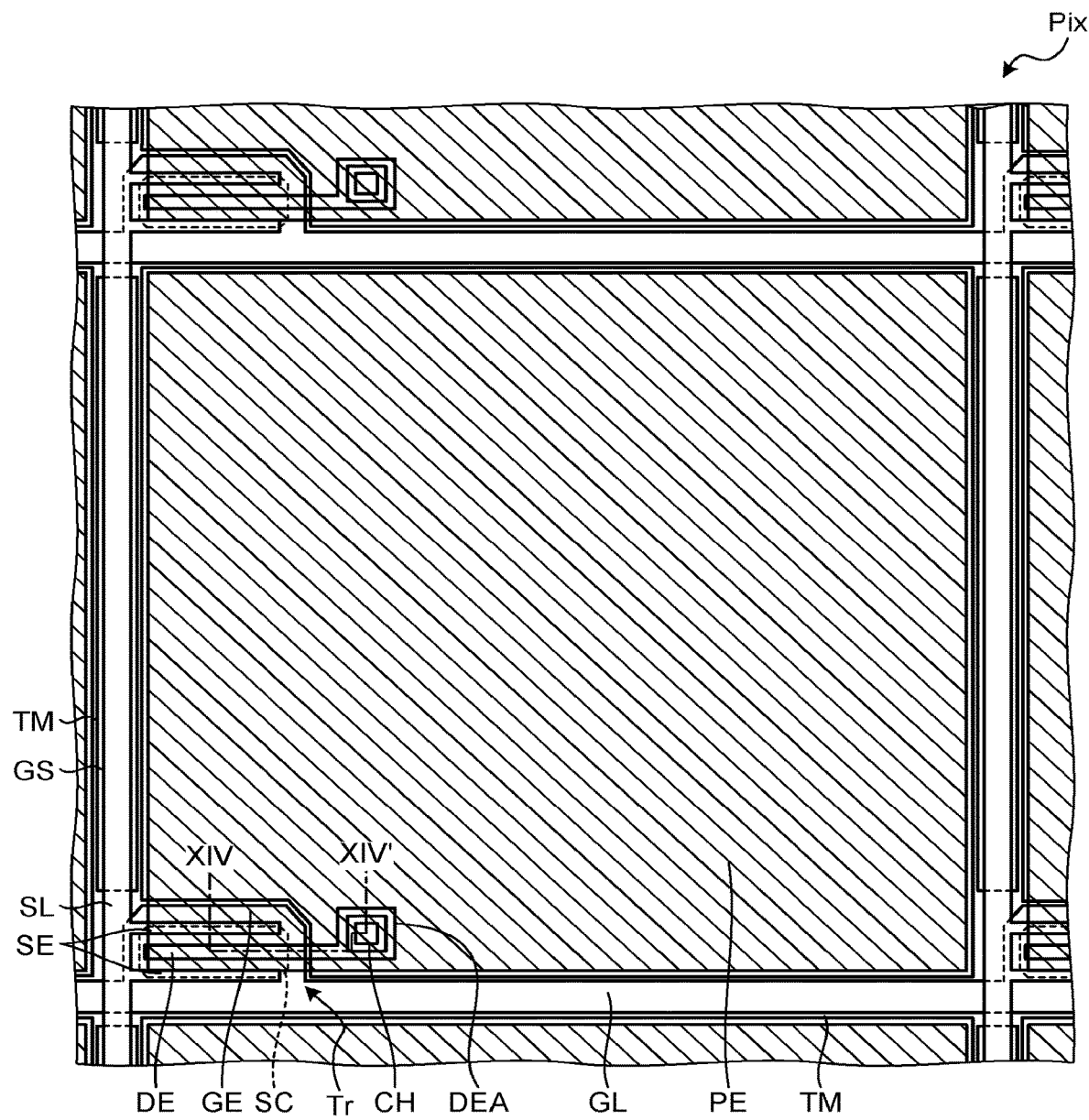
FIG. 13 is a plan view illustrating a pixel electrode in the pixel.
Figure 14:
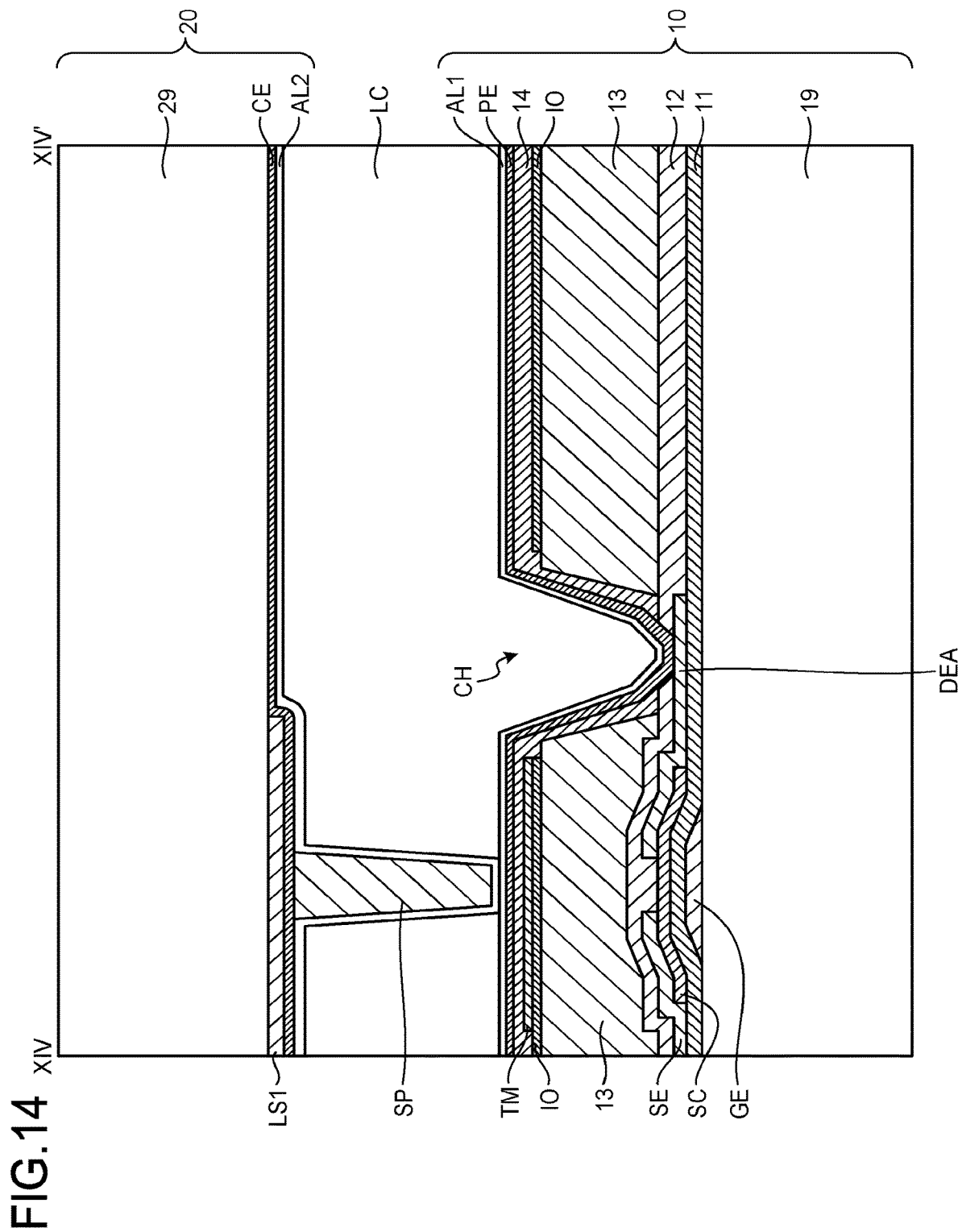
FIG. 14 is a sectional view along XIV-XIV' of FIG. 12.
Figure 15:
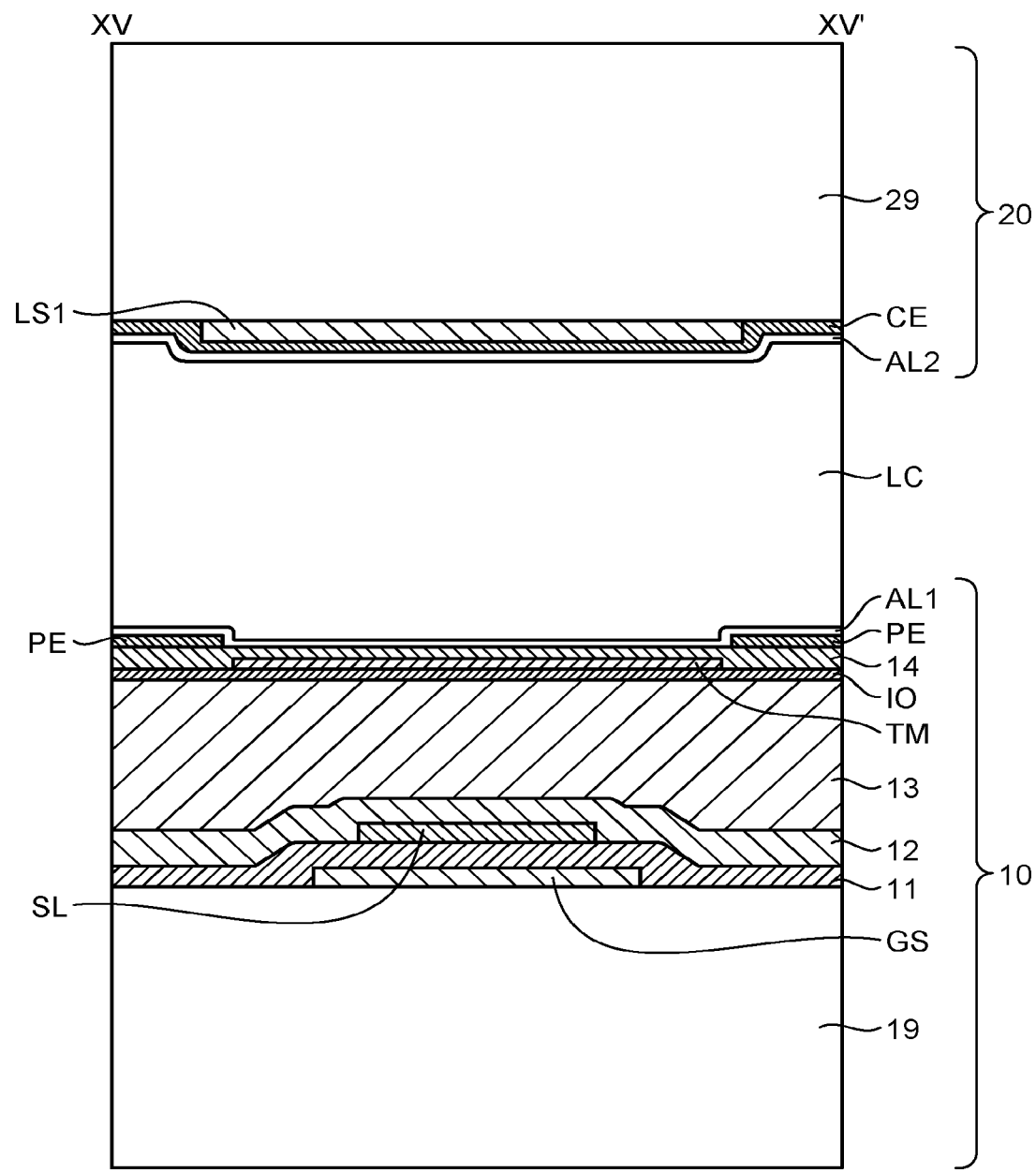
FIG. 15 is a sectional view along XV-XV' of FIG. 12.
Figure 16:
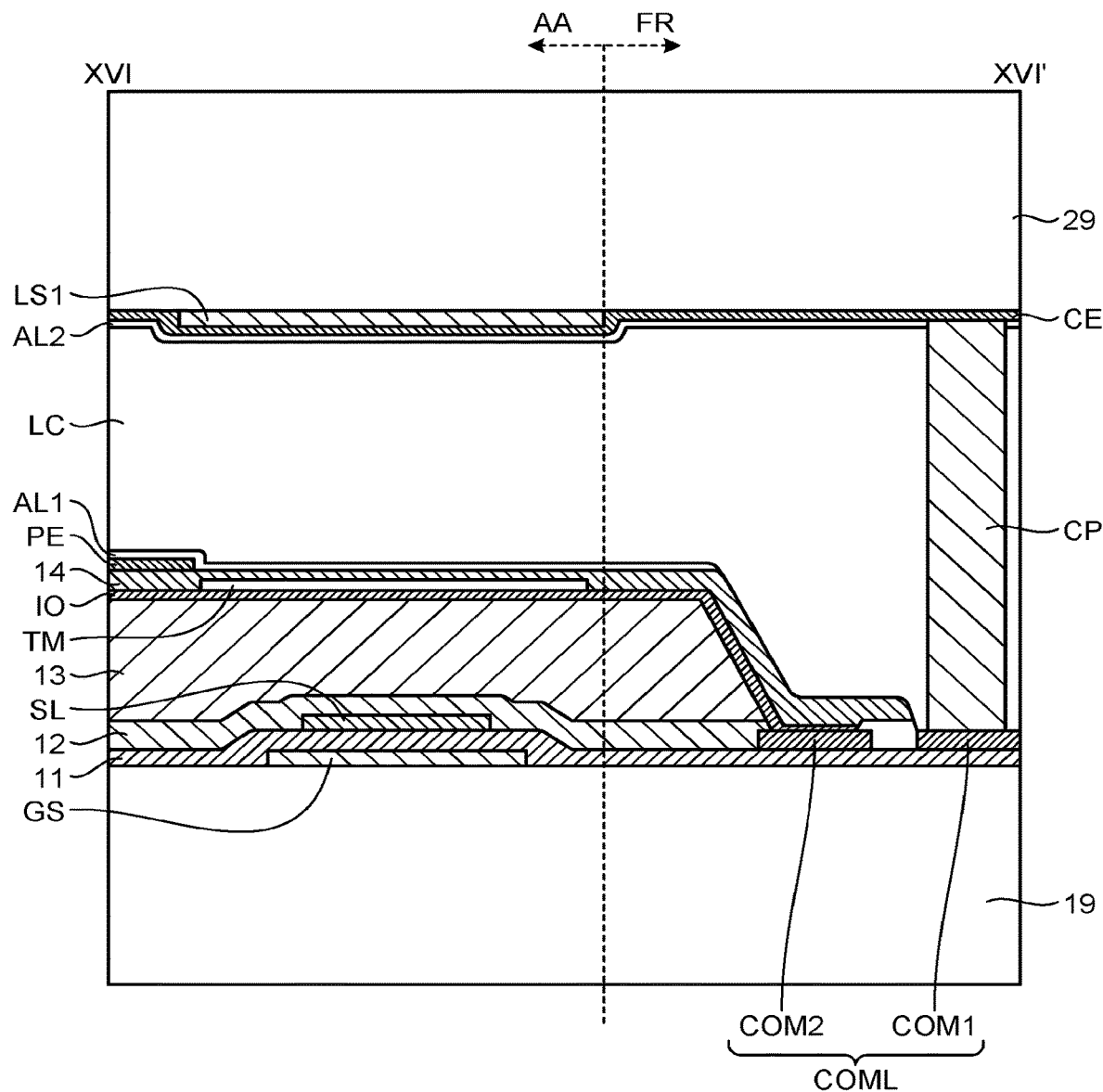
FIG. 16 is a sectional view of a peripheral region.

FIG. 10 is a plan view illustrating the scanning lines, the signal lines, and the switching element in the pixel. FIGS. 11A, 11B, and 11C are plan views illustrating a holding capacitance layer in the pixel. FIG. 12 is a plan view illustrating an auxiliary metal layer and an opening region in the pixel. FIG. 13 is a plan view illustrating the pixel electrode in the pixel. FIG. 14 is a sectional view along XIV-XIV' of FIG. 12. FIG. 15 is a sectional view along XV-XV' of FIG. 12. FIG. 16 is a sectional view of the peripheral region. As illustrated in FIGS. 1, 2, and 10, the array substrate 10 is provided with the signal lines SL and the scanning lines GL so as to form a grid in the plan view. In other words, one surface of the array substrate 10 is provided with the signal lines arranged in the first direction PX with spaces therebetween and the scanning lines arranged in the second direction PY with spaces therebetween. A region surrounded by the adjacent scanning lines GL and the adjacent signal lines SL corresponds to the pixel Pix. The pixel Pix is provided with the pixel electrode PE and the switching element Tr. In the present embodiment, the switching element Tr is a bottom-gate thin film transistor. The switching element Tr includes a semiconductor layer SC overlapping, in the plan view, a gate electrode GE electrically coupled to a corresponding one of the scanning lines GL.

As illustrated in FIG. 10, the scanning lines GL are wiring of a metal such as molybdenum (Mo) or aluminum (Al), a multilayered body of these metals, or an alloy thereof. The signal lines SL are wiring of a metal such as aluminum or an alloy thereof.

As illustrated in FIG. 10, the semiconductor layer SC is provided so as not to protrude from the gate electrode GE in the plan view. As a result, the light-source light L traveling toward the semiconductor layer SC from the gate electrode GE side is reflected, and light leakage is less likely to occur in the semiconductor layer SC.

As illustrated in FIG. 10, source electrodes SE are formed such that two electrical conductors that are the same as the signal line SL extend from the signal line SL in the same layer as that of the signal line SL and in a direction intersecting the signal line. With this configuration, the source electrodes SE electrically coupled to the signal line SL overlap one end of the semiconductor layer SC in the plan view.

As illustrated in FIG. 10, in the plan view, a drain electrode DE is provided in a position between the adjacent electrical conductors of the source electrodes SE. The drain electrode DE overlaps the semiconductor layer SC in the plan view. A portion of the semiconductor layer SC overlapping neither the source electrodes SE nor the drain electrode DE serves as a channel of the switching element Tr. As illustrated in FIG. 13, a contact electrode DEA electrically coupled to the drain electrode DE is electrically coupled to the pixel electrode PE through a contact hole CH.

As illustrated in FIG. 14, the array substrate 10 includes a first light-transmitting base 19 formed of, for example, glass. The material of the first light-transmitting base 19 may be any material having a light transmitting capability and may be, for example, a resin such as polyethylene terephthalate.

As illustrated in FIG. 14, a first insulating layer 11 is provided on the first light-transmitting base 19, and the scanning line GL (refer to FIG. 10) and the gate electrode GE are provided on the first insulating layer 11.

As illustrated in FIG. 14, a first insulating layer 11 is provided so as to cover the scanning line GL and the gate electrode GE. The first insulating layer 11 and the second insulating layer 12 are formed of, for example, a transparent inorganic insulating material such as silicon nitride.

The semiconductor layer SC is stacked on the first insulating layer 11. The semiconductor layer SC is made of, for example, amorphous silicon, but may be made of polysilicon or an oxide semiconductor.

The source electrodes SE covering portions of the semiconductor layer SC, the signal line SL, and the drain electrode DE covering a portion of the semiconductor layer SC are provided on the first insulating layer 11. The drain electrode DE is formed of the same material as that of the signal line SL. A third insulating layer 13 is provided above the semiconductor layer SC, the signal line SL, and the drain electrode DE. The third insulating layer 13 is formed of, for example, a light-transmitting organic insulating material such as an acrylic resin. The third insulating layer 13 has a film thickness greater than other insulating films formed of an inorganic material. As a result, the switching element Tr, the scanning line GL, and the signal line SL, which are covered with the thick third insulating layer 13, are less affected by the common potential of the holding capacitance electrode IO.

As illustrated in FIG. 14, the holding capacitance electrode IO is provided on the third insulating layer 13. The holding capacitance electrode IO is formed of a light-transmitting conductive material such as indium tin oxide (ITO).

As illustrated in FIG. 6, a first display region AA1, a second display region AA2, and a third display region AA3 are arranged in this order from a position closer to the side light source 3 toward a farther position. In the first display region AA1 of FIG. 6, the holding capacitance electrode IO has a shape illustrated in FIG. 11A. In the second display region AA2 of FIG. 6, the holding capacitance electrode IO has a shape illustrated in FIG. 11B. In the third display region AA3 of FIG. 6, the holding capacitance electrode IO has a shape illustrated in FIG. 11C.

As illustrated in FIG. 11A, the holding capacitance electrode IO is formed of a solid film, and only portions thereof overlapping the contact holes CH and surrounding portions thereof are bored out. The holding capacitance electrode IO extends across the adjacent pixels Pix and is provided over the pixels Pix.

As illustrated in FIG. 11B, the holding capacitance electrode IO has a region IOX including no light-transmitting conductive material in each of the regions surrounded by the scanning lines GL and the signal lines SL. The holding capacitance electrode IO has a grid shape that covers over the scanning lines GL and the signal lines SL along the scanning lines GL and the signal lines SL. The holding capacitance electrode IO extends across the adjacent pixels Pix and is provided over the pixels Pix.

As illustrated in FIG. 11C, the holding capacitance electrode IO has a region IOX including no light-transmitting conductive material in each of the regions surrounded by the scanning lines GL and the signal lines SL. The holding capacitance electrode IO has a grid shape that covers over the scanning lines GL and the signal lines SL along the scanning lines GL and the signal lines SL. The holding capacitance electrode IO extends across the adjacent pixels Pix and is provided over the pixels Pix.

As for the area of the holding capacitance electrode IO, the region IOX including no light-transmitting conductive material is larger as the display region is farther from the side light source 3. Hence, since the area of the region IOX including no light-transmitting conductive material varies, the area of the holding capacitance electrode IO is larger in the order of the first display region AA1 of FIG. 6, the second display region AA2 of FIG. 6, and the third display region AA3 of FIG. 6.

As illustrated in FIG. 14, a portion on the holding capacitance electrode IO is provided with a conductive metal layer TM. The metal layer TM is wiring of a metal such as molybdenum (Mo) or aluminum (Al), a multilayered body of these metals, or an alloy thereof. As illustrated in FIG. 12, the metal layer TM is provided in regions overlapping the signal lines SL, the scanning lines GL, and the switching elements Tr in the plan view. With this configuration, the metal layer TM is formed into a grid shape, and openings AP surrounded by the metal layer TM are formed.

As illustrated in FIG. 12, the switching element Tr is provided in a region surrounded by the scanning lines GL and the signal lines SL. At least the switching element Tr is covered with the third insulating layer 13 serving as an organic insulating layer, and the metal layer TM having a larger area than that of the switching element Tr is located above the third insulating layer 13. This configuration can reduce light leakage of the switching element Tr.

The metal layer TM may be located below the holding capacitance electrode IO, and only needs to be stacked with the holding capacitance electrode IO. The metal layer TM has a lower electrical resistance than that of the holding capacitance electrode IO.

As illustrated in FIG. 12, the width of the metal layer TM overlapping the signal line SL is greater than the width of the signal line SL in the plan view. This configuration restrains reflected light reflected by edges of the signal line SL from being emitted from the display panel 2. The width of the metal layer TM and the width of the signal line SL are lengths in a direction intersecting the extending direction of the signal line SL. The width of the metal layer TM overlapping the scanning line GL is greater than the width of the scanning line GL. The width of the metal layer TM and the width of the scanning line GL are lengths in a direction intersecting the extending direction of the scanning line GL.

A fourth insulating layer 14 is provided on the upper side of the holding capacitance electrode IO and the metal layer TM. The fourth insulating layer 14 is formed of, for example, a transparent inorganic insulating material such as silicon nitride.

As illustrated in FIG. 14, the pixel electrode PE is provided on the fourth insulating layer 14. The pixel electrode PE is formed of a light-transmitting conductive material such as ITO. The pixel electrode PE is electrically coupled to the contact electrode DEA through the contact hole CH provided in the fourth insulating layer 14 and the third insulating layer 13. As illustrated in FIG. 13, each of the pixel electrodes PE is partitioned off on a pixel Pix basis. The first orientation film AL1 is provided on the upper side of the pixel electrode PE.

As illustrated in FIG. 14, the counter substrate 20 includes a second light-transmitting base 29 formed of, for example, glass. The material of the second light-transmitting base 29 may be any material having a light transmitting capability and may be, for example, a resin such as polyethylene terephthalate. The second light-transmitting base 29 is provided with the common electrode CE. The common electrode CE is formed of a light-transmitting conductive material such as ITO. The second orientation film AL2 is provided on a surface of the common electrode CE.

As illustrated in FIGS. 12 and 15, in the display device of the first embodiment, a light-blocking layer GS located in the same layer as that of the scanning line GL is provided so as to extend along the signal line SL and overlap a portion of the signal line SL. The light-blocking layer GS is formed of the same material as that of the scanning line GL. The light-blocking layer GS is not provided at a portion where the scanning line GL intersects the signal line SL in the plan view.

As illustrated in FIG. 15, the light-blocking layer GS is provided opposite to the metal layer TM with the signal line SL therebetween. The width of the light-blocking layer GS is greater than that of the signal line SL, and less than that of the metal layer TM. The width of the light-blocking layer GS, the width of the metal layer TM, and the width of the signal line SL are lengths in a direction intersecting the extending direction of the signal line SL. In this manner, the light-blocking layer GS has a greater width than that of the signal line SL, and thus, restrains the reflected light reflected by the edges of the signal line SL from being emitted from the display panel 2. As a result, visibility of images is improved in the display device 1.

As illustrated in FIGS. 14 and 15, the counter substrate 20 is provided with a light-blocking layer LS1. The light-blocking layer LS1 is provided in a region overlapping the signal line SL, the scanning line GL, and the switching element Tr in the plan view. As illustrated in FIG. 15, the light-blocking layer LS1 has a greater width than that of the metal layer TM. This configuration restrains reflected light reflected by edges of the signal line SL, the scanning line GL, and the metal layer TM from being emitted from the display panel 2. As a result, the visibility of images is improved in the display device 1.

As illustrated in FIG. 14, a spacer SP is disposed between the array substrate 10 and the counter substrate 20 and improves uniformity of distance between the array substrate 10 and the counter substrate 20.

As illustrated in FIG. 16, the common potential wiring COML is routed in the peripheral region FR. The common potential wiring COML includes, for example, first common potential wiring COML1 and second common potential wiring COML2. The first common potential wiring COML1 is electrically coupled to the common electrode CE of the counter substrate 20 through a conductive member CP with electrical conductivity. The conductive member CP may be a conductive pillar or may be a sealing material containing Au particles.

As illustrated in FIG. 16, in the peripheral region FR, the holding capacitance electrode IO is electrically coupled to the second common potential wiring COML2. The metal layer TM is disposed in the display region AA.

As illustrated in FIG. 6, the first display region AA1, the second display region AA2, and the third display region AA3 are arranged in this order from a position closer to the side light source 3 toward a farther position. As illustrated in FIG. 5, the light quantity of the light-source light L propagating in the array substrate 10 and the counter substrate 20 decreases as the light-source light L propagates away from the side light source 3. In other words, the light quantity of the light-source light L is greater as the light-source light L is closer to the side light source 3.

As the light quantity is greater, the light leakage of the switching element Tr reduces the written potential of each of the pixel electrodes PE by a larger amount. When the first display region AA1, the second display region AA2, and the third display region AA3 illustrated in FIG. 6 are compared, the reduction in the written potential of each of the pixel electrodes PE is larger in the order from a position closer to the side light source 3 toward a farther position, that is, in the order of the first display region AA1, the second display region AA2, and the third display region AA3.

As a result, when the third display region AA3 is compared with the first display region AA1, the flickers due to the light leakage of the switching element Tr are more likely to occur in the first display region AA1 than in the third display region AA3.

As described above, the display device 1 includes the array substrate 10, the counter substrate 20, the liquid crystal layer 50, and the side light source 3. The array substrate 10 includes the pixel electrodes PE serving as first light-transmitting electrodes each disposed in a corresponding one of the pixels Pix. The counter substrate 20 includes positions that overlap the pixel electrodes PE in the plan view and are provided with the common electrode CE serving as a second light-transmitting electrode. The liquid crystal layer 50 includes the polymer-dispersed liquid crystals LC filled between the array substrate 10 and the counter substrate 20. The side light source 3 emits the light that propagates in the array substrate 10 and the counter substrate 20 toward one of the side surfaces of the counter substrate 20. The side light source 3 may emit the light that propagates in the array substrate 10 and the counter substrate 20 toward one of the side surfaces of the array substrate 10.

The array substrate includes, in each of the pixels Pix, the holding capacitance electrode IO serving as a third light-transmitting electrode that at least partially overlaps the pixel electrode PE in the plan view with the insulating layer interposed therebetween. A constant voltage is applied from the common potential wiring COML to the common electrode CE and the holding capacitance electrode IO so as to have the common potential. This voltage application generates the holding capacitance HC between the pixel electrode PE and the holding capacitance electrode IO. In the first embodiment, the area of the holding capacitance electrode IO of the pixel Pix in the third display region AA3 is larger than the area of the holding capacitance electrode IO of the pixel Pix in the first display region AA1. The holding capacitance HC of the pixel Pix in the first display region AA1 is larger than the holding capacitance HC of the pixel Pix in the third display region AA3. As a result, the light leakage of the switching element Tr exerts a smaller influence at the pixel Pix in the first display region AA1, and thus, the partial flickers in the display region AA are reduced. The display device 1 of the first embodiment performs the driving using the field-sequential system from one surface of the display panel 2 and can improve the visibility of images displayed on the display panel.

The area of the holding capacitance electrode IO of the pixel Pix is larger in the order from a position closer to the side light source 3 toward a farther position, that is, in the order of the first display region AA1, the second display region AA2, and the third display region AA3. This configuration further reduces the partial flickers in the display region AA.

Second Embodiment

Figure 17:
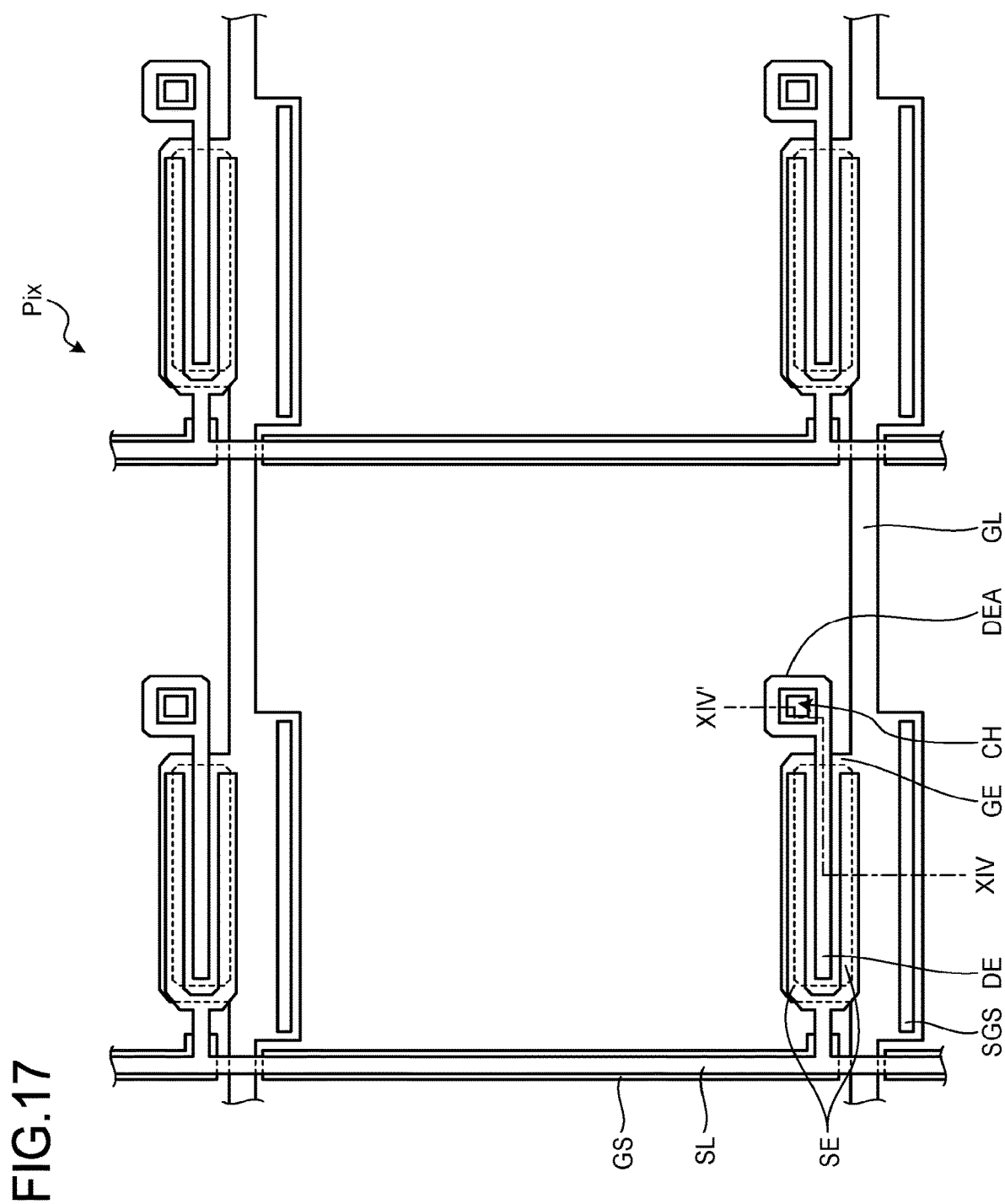
FIG. 17 is a plan view illustrating the scanning line, the signal line, and the switching element in the pixel according to a second embodiment.
Figure 18B:
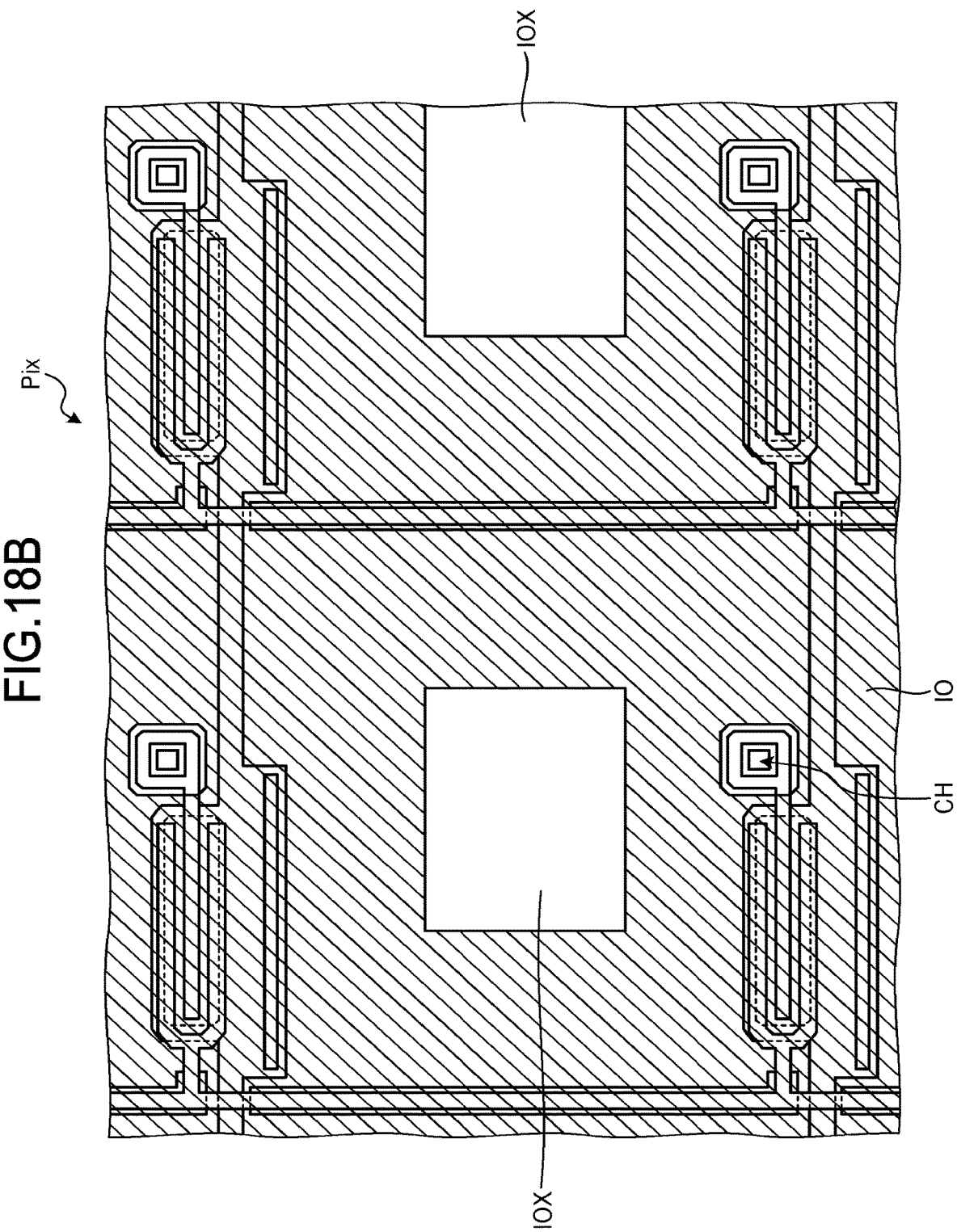
FIG. 18B is a plan view illustrating the holding capacitance layer in the pixel according to the second embodiment.
Figure 18C:
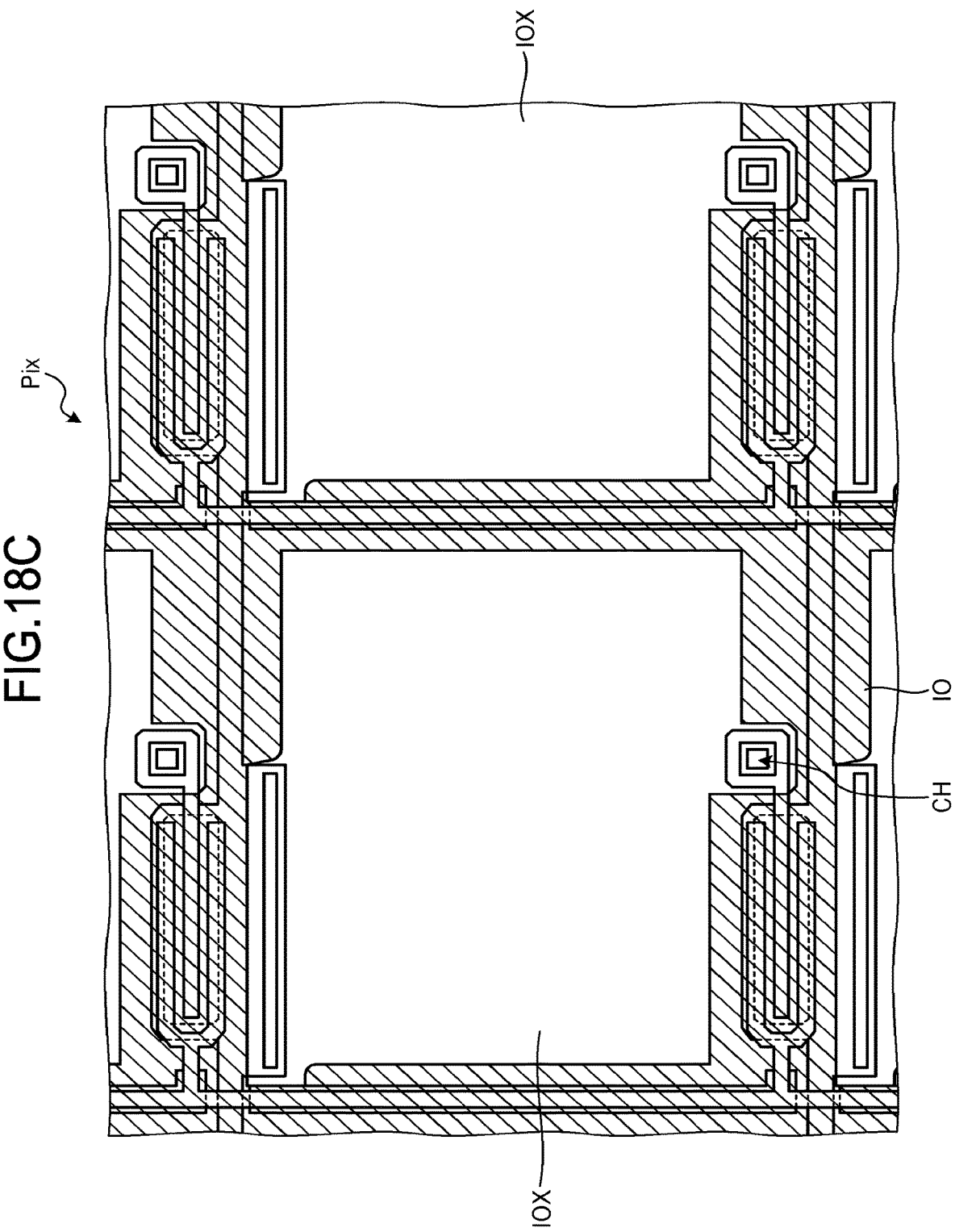
FIG. 18C is a plan view illustrating the holding capacitance layer in the pixel according to the second embodiment.
Figure 20:
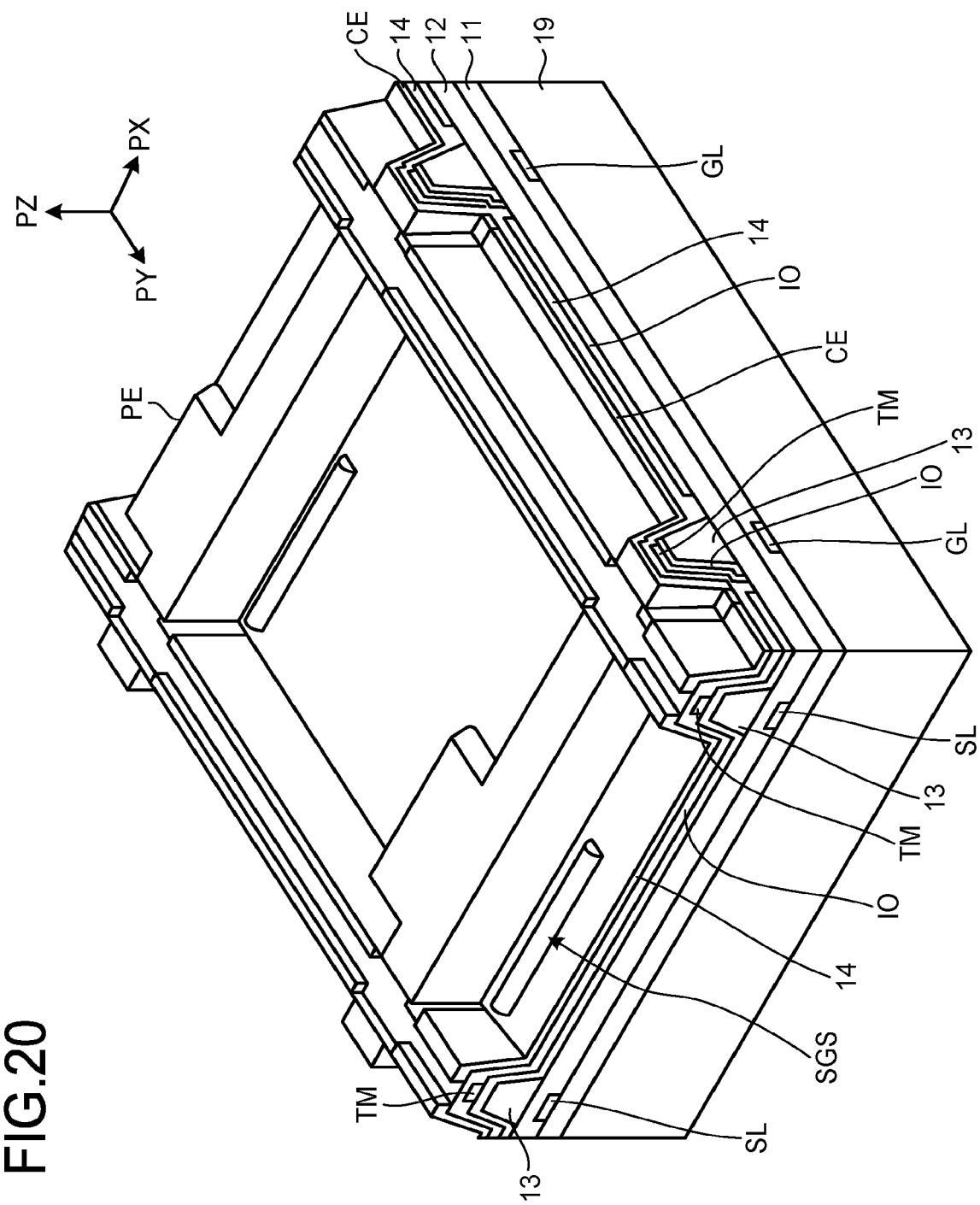
FIG. 20 is a partial perspective view of the pixel according to the second embodiment.
Figure 21:
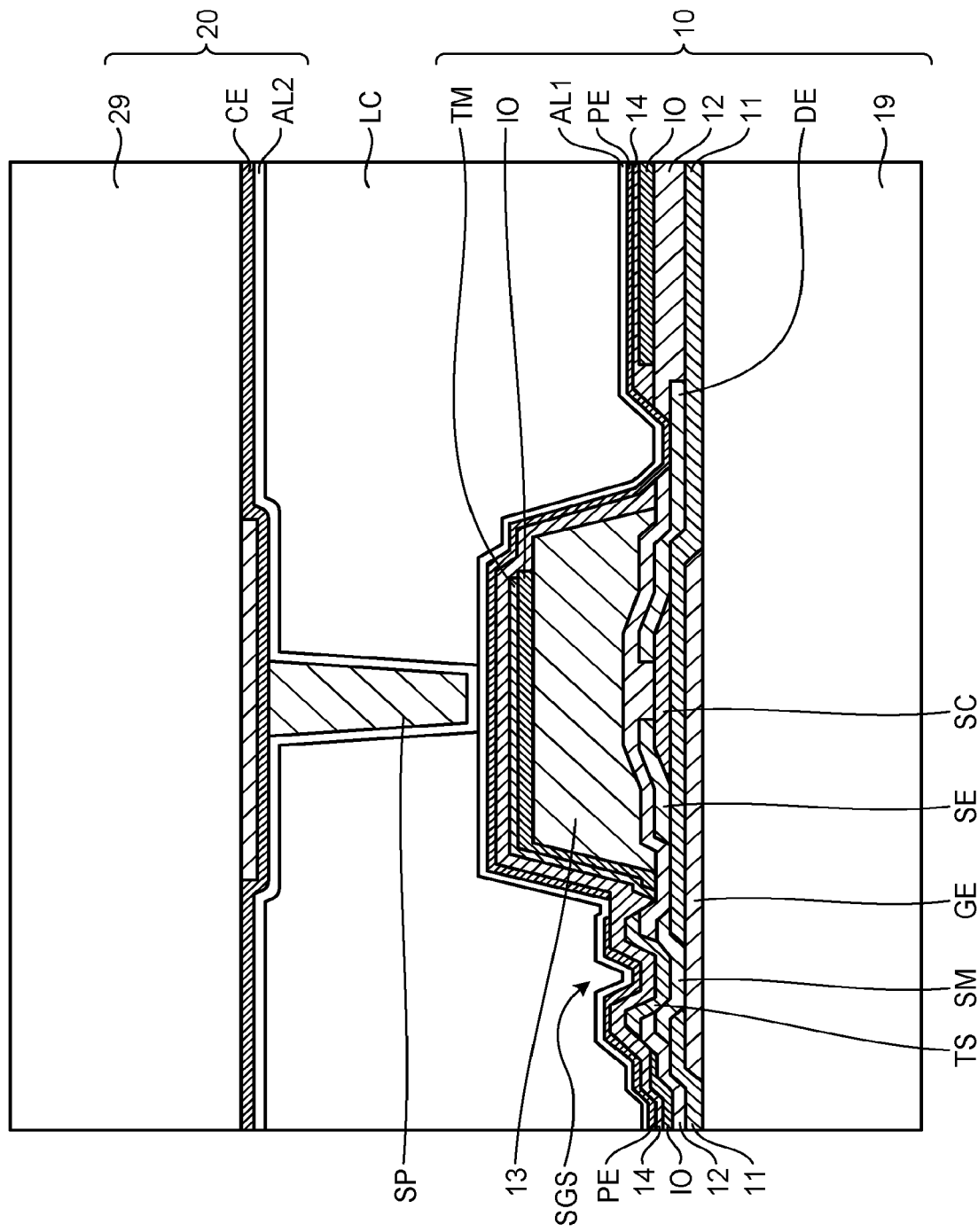
FIG. 21 is a sectional view along XIV-XIV' of FIG. 17.

FIG. 17 is a plan view illustrating the scanning line, the signal line, and the switching element in the pixel according to a second embodiment. FIGS. 18A, 18B, and 18C are plan views illustrating the holding capacitance layer in the pixel according to the second embodiment. FIG. 19 is a plan view illustrating the pixel electrode in the pixel according to the second embodiment. FIG. 20 is a partial perspective view of the pixel according to the second embodiment. FIG. 21 is a sectional view along XIV-XIV' of FIG. 17. The same components as those described in the above-described embodiment are denoted by the same reference numerals, and the duplicate description thereof will not be repeated.

As illustrated in FIG. 17, in the pixel Pix of the second embodiment, the source electrode SE is drawn as one piece from the signal line SL and divided into two branches. The light-blocking layer GS overlaps, in the plan view, a portion of the source electrode SE drawn as the one piece from the signal line SL. This configuration restrains reflected light reflected by edges of the source electrode SE from being emitted from the display panel 2. As a result, the visibility of images is improved in the display device 1.

As illustrated in FIG. 6, the first display region AA1, the second display region AA2, and the third display region AA3 are arranged in this order from a position closer to the side light source 3 toward a farther position. In the first display region AA1 of FIG. 6, the holding capacitance electrode IO has a shape illustrated in FIG. 18A. In the second display region AA2 of FIG. 6, the holding capacitance electrode IO has a shape illustrated in FIG. 18B. In the third display region AA3 of FIG. 6, the holding capacitance electrode IO has a shape illustrated in FIG. 18C.

As illustrated in FIG. 18A, the holding capacitance electrode IO is formed of the solid film, and only portions thereof overlapping the contact holes CH and surrounding portions thereof are bored out. The holding capacitance electrode IO extends across the adjacent pixels Pix.

As illustrated in FIG. 18B, the holding capacitance electrode IO has a region IOX including no light-transmitting conductive material in each of the regions surrounded by the scanning lines GL and the signal lines SL. The holding capacitance electrode IO has a grid shape that covers over the scanning lines GL and the signal lines SL along the scanning lines GL and the signal lines SL. The holding capacitance electrode IO extends across the adjacent pixels Pix and is provided over the pixels Pix.

As illustrated in FIG. 18C, the holding capacitance electrode IO has a region IOX including no light-transmitting conductive material in each of the regions surrounded by the scanning lines GL and the signal lines SL. The holding capacitance electrode IO has a grid shape that covers over the scanning lines GL and the signal lines SL along the scanning lines GL and the signal lines SL. The holding capacitance electrode IO extends across the adjacent pixels Pix and is provided over the pixels Pix.

Since the area of the region IOX including no light-transmitting conductive material varies, the area of the holding capacitance electrode IO is larger in the order of the first display region AA1 of FIG. 6, the second display region AA2 of FIG. 6, and the third display region AA3 of FIG. 6.

As illustrated in FIG. 19, each of the pixel electrodes PE is partitioned off on a pixel Pix basis, and a portion of the pixel electrode PE overlaps the signal line SL in the plan view. The pixel electrode PE overlaps the scanning line GL on one side thereof in the plan view and is disposed over the adjacent pixel Pix, but does not overlap the scanning line GL on the other side thereof in the plan view.

As illustrated in FIG. 20, the pixel electrode PE is located above a slant surface of the third insulating layer 13 covering over the signal line SL. This configuration increases the region of the pixel electrode PE, and increases the area of the effective pixel Pix.

As illustrated in FIG. 21, the pixel Pix of the second embodiment has a region including the third insulating layer 13 and a region not including the third insulating layer 13. As illustrated in FIG. 20, the region including the third insulating layer 13 is located over the scanning line GL and over the signal line SL. As illustrated in FIG. 20, the third insulating layer 13 has a grid shape that covers over the scanning lines GL and the signal lines SL along the scanning lines GL and the signal lines SL. As illustrated in FIG. 21, the region including the third insulating layer 13 is located over the semiconductor layer SC, that is, over the switching element Tr. As a result, the array substrate 10 has regions surrounded by the scanning lines GL and the signal lines SL where the third insulating layer 13 is not present, and thus, has regions where the thickness of the insulating layers is less than that of the insulating layers overlapping the scanning lines GL and the signal lines SL in the plan view. The regions surrounded by the scanning lines GL and the signal lines SL have relatively higher optical transmittance and higher light transmitting capability than those over the scanning lines GL and over the signal lines SL.

As illustrated in FIG. 1, the light enters in the second direction PY from the side light source 3. The light entrance direction is a direction along the second direction PY. Accordingly, as illustrated in FIG. 17, a light-blocking structure SGS is provided on a side of the switching element Tr closer to the light emitters 31 of the side light source 3 in the light entrance direction. In the first direction PX intersecting the light entrance direction, the length of the light-blocking structure SGS is longer than the length of the switching element Tr. This configuration allows the light-blocking structure SGS to block a light path of the light propagating toward the switching element Tr and reduce the light leakage of the switching element Tr.

The light-blocking structure SGS is formed such that the gate electrode GE of the switching element Tr extends, and a first light-blocking layer SM formed of a conductive material located in the same layer as that of the signal line is stacked on the upper side of a conductive material located in the same layer as that of the scanning line. A second light-blocking layer TS formed of the same conductive material as that of the metal layer is stacked on the upper side of the first light-blocking layer SM.

As illustrated in FIG. 21, the semiconductor layer SC of the switching element Tr is covered with the third insulating layer 13 serving as the organic insulating layer, and the slant surface of the third insulating layer 13 in the light entrance direction where the light-blocking structure SGS is located is covered with the metal layer TM. This configuration allows the metal layer TM to block the light path of the light propagating toward the switching element Tr, and reduce the light leakage of the switching element Tr.

The pixel electrode PE is stacked above the second light-blocking layer TS with the fourth insulating layer 14 interposed therebetween. With this configuration, the polymer-dispersed liquid crystal LC above the light-blocking structure SGS can also contribute to the scattering.

As illustrated in FIGS. 19 and 21, the pixel electrode PE disposed over the light-blocking structure SGS is disposed in the pixel Pix different from the pixel Pix in which the pixel electrode disposed over the switching element Tr. The pixel electrode PE disposed over the light-blocking structure SGS and the pixel electrode disposed over the switching element Tr are uncoupled from each other and do not short each other.

First Modification of Second Embodiment

Figure 22:
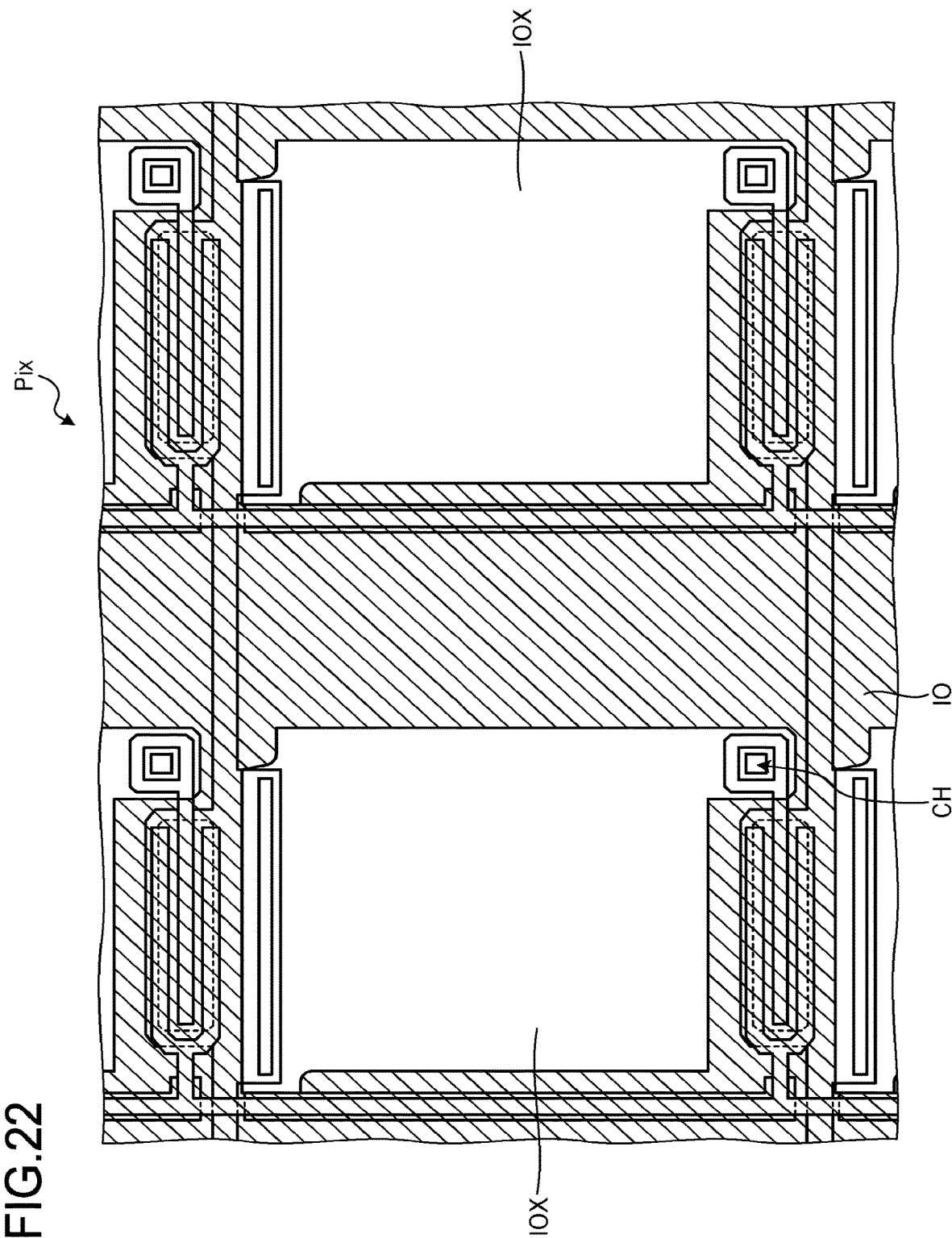
FIG. 22 is a plan view illustrating the holding capacitance layer in the pixel according to a first modification of the second embodiment.

FIG. 22 is a plan view illustrating the holding capacitance layer in the pixel according to a first modification of the second embodiment. The same components as those described in either of the above-described embodiments are denoted by the same reference numerals, and the duplicate description thereof will not be repeated.

In the first modification of the second embodiment, the holding capacitance electrode IO in the first display region AA1 of FIG. 6 has the shape illustrated in FIG. 18A; the holding capacitance electrode IO in the second display region AA2 of FIG. 6 has a shape illustrated in FIG. 22; and the holding capacitance electrode IO in the third display region AA3 of FIG. 6 has the shape illustrated in FIG. 18C.

Since the area of the region IOX including no light-transmitting conductive material varies, the area of the holding capacitance electrode IO is larger in the order of the first display region AA1 of FIG. 6, the second display region AA2 of FIG. 6, and the third display region AA3 of FIG. 6.

The holding capacitance electrode IO according to the first modification of the second embodiment can also be applied to the pixel Pix of the first embodiment.

Second Modification of Second Embodiment

Figure 23:
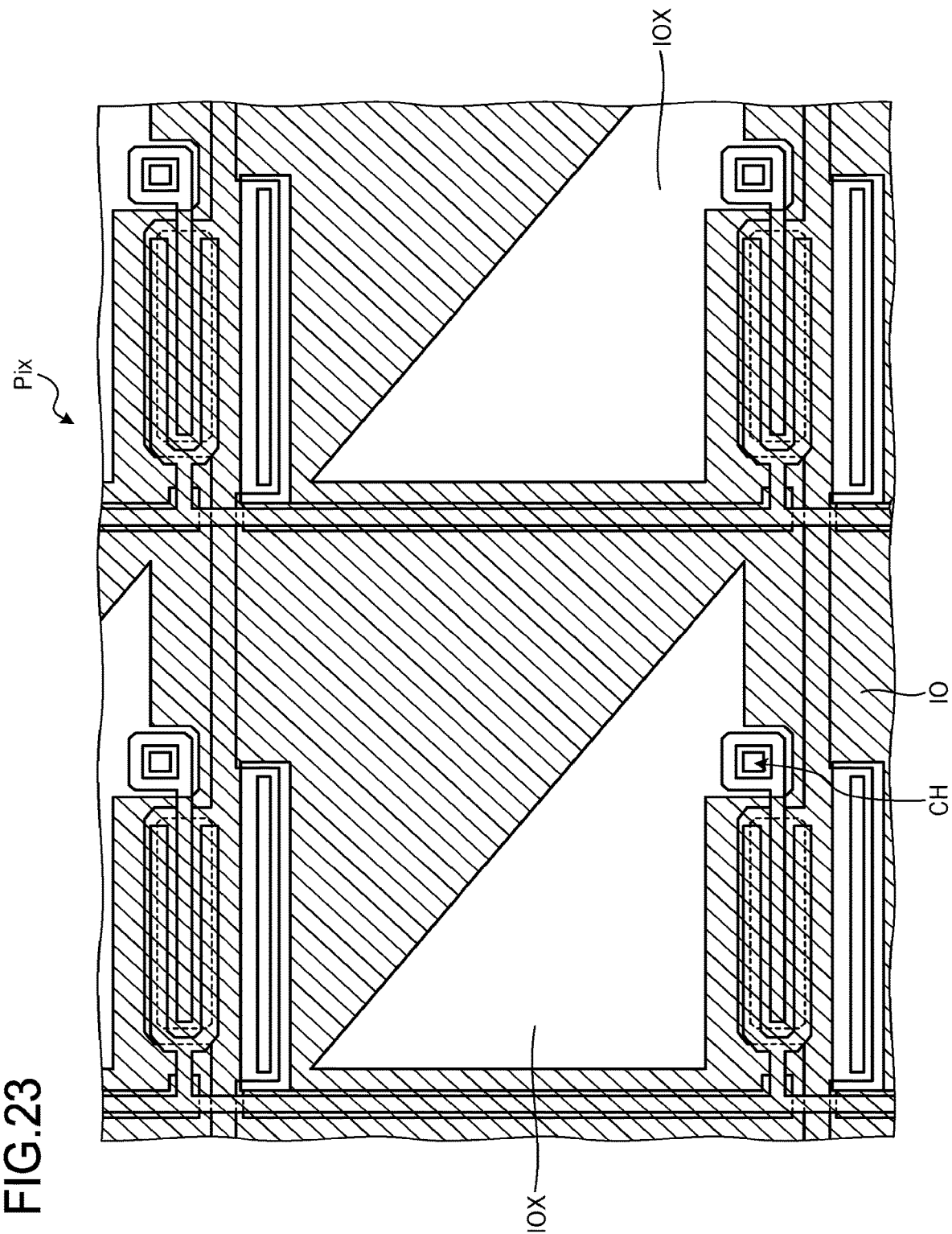
FIG. 23 is a plan view illustrating the holding capacitance layer in the pixel according to a second modification of the second embodiment.

FIG. 23 is a plan view illustrating the holding capacitance layer in the pixel according to a second modification of the second embodiment. The same components as those described in any one of the above-described embodiments are denoted by the same reference numerals, and the duplicate description thereof will not be repeated.

In the second modification of the second embodiment, the holding capacitance electrode IO in the first display region AA1 of FIG. 6 has the shape illustrated in FIG. 18A; the holding capacitance electrode IO in the second display region AA2 of FIG. 6 has a shape illustrated in FIG. 23; and the holding capacitance electrode IO in the third display region AA3 of FIG. 6 has the shape illustrated in FIG. 18C.

Since the area of the region IOX including no light-transmitting conductive material varies, the area of the holding capacitance electrode IO is larger in the order of the first display region AA1 of FIG. 6, the second display region AA2 of FIG. 6, and the third display region AA3 of FIG. 6.

The holding capacitance electrode IO according to the second modification of the second embodiment can also be applied to the pixel Pix of the first embodiment.

Third Modification of Second Embodiment

Figure 24:
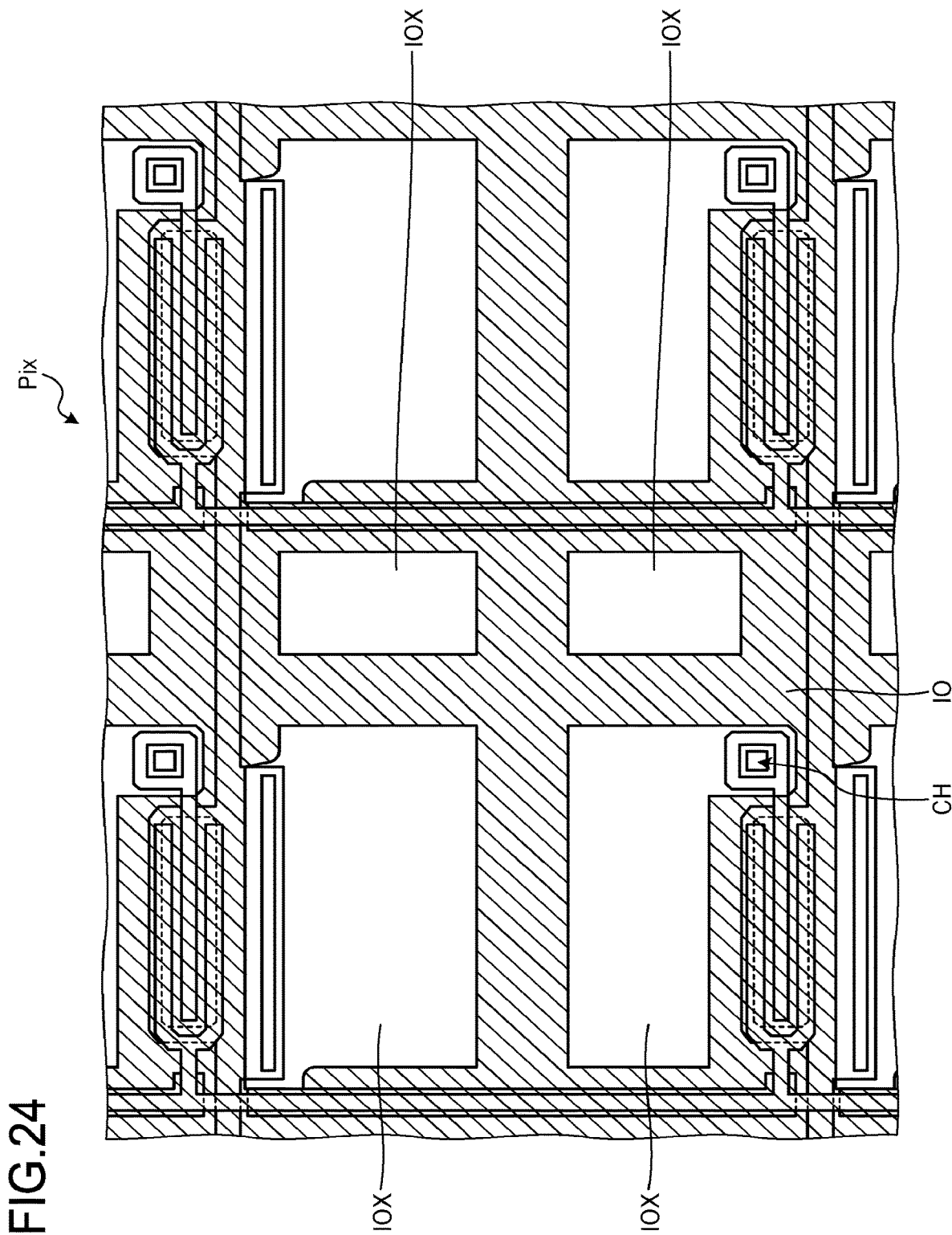
FIG. 24 is a plan view illustrating the holding capacitance layer in the pixel according to a third modification of the second embodiment.

FIG. 24 is a plan view illustrating the holding capacitance layer in the pixel according to a third modification of the second embodiment. The same components as those described in any one of the above-described embodiments are denoted by the same reference numerals, and the duplicate description thereof will not be repeated.

In the third modification of the second embodiment, the holding capacitance electrode IO in the first display region AA1 of FIG. 6 has the shape illustrated in FIG. 18A; the holding capacitance electrode IO in the second display region AA2 of FIG. 6 has a shape illustrated in FIG. 24; and the holding capacitance electrode IO in the third display region AA3 of FIG. 6 has the shape illustrated in FIG. 18C.

Since the area of the region IOX including no light-transmitting conductive material varies, the area of the holding capacitance electrode IO is larger in the order of the first display region AA1 of FIG. 6, the second display region AA2 of FIG. 6, and the third display region AA3 of FIG. 6.

The holding capacitance electrode IO according to the third modification of the second embodiment can also be applied to the pixel Pix of the first embodiment.

Third Embodiment

Figure 25:
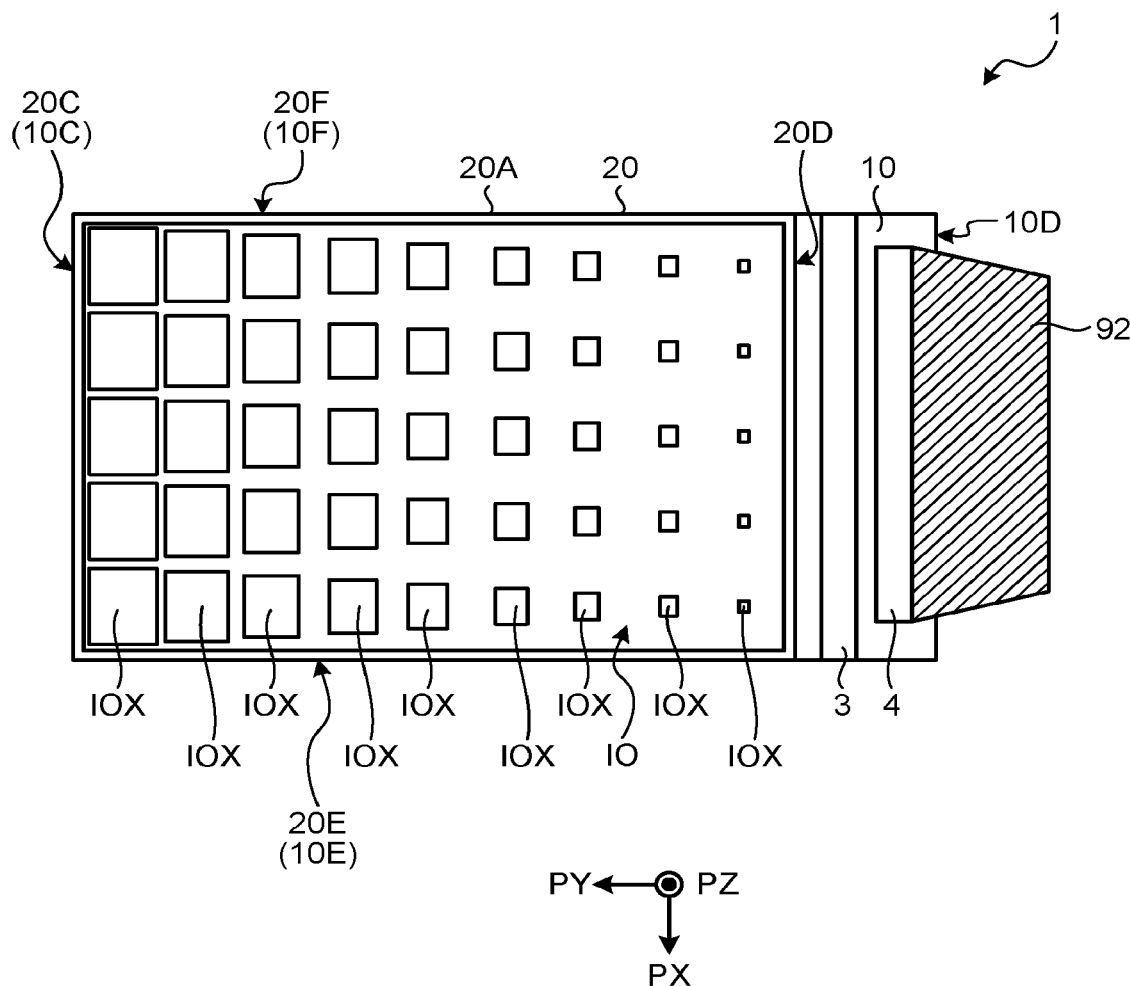
FIG. 25 is a schematic diagram illustrating regions including no light-transmitting conductive material on the planar surface of the display device according to a third embodiment.

FIG. 25 is a schematic diagram illustrating the regions including no light-transmitting conductive material on the planar surface of the display device according to a third embodiment. FIG. 25 schematically illustrates sizes of the regions IOX in the holding capacitance electrode IO, as well as positions of the regions IOX relative to the side light source 3, and does not illustrate the other components. The same components as those described in any one of the above-described embodiments are denoted by the same reference numerals, and the duplicate description thereof will not be repeated. The description has been given that the area of the region IOX including no light-transmitting conductive material is larger in the order of the first display region AA1, the second display region AA2, and the third display region AA3 illustrated in FIG. 6. However, the present disclosure is not limited to the example of dividing the display region AA into the three regions of different areas of the region IOX including no light-transmitting conductive material, and a plurality of divided areas may be employed. For example, as illustrated in FIG. 25, the holding capacitance electrode IO may exhibit a gradation of the regions IOX such that the region IOX including no light-transmitting conductive material is gradually enlarged as the distance from the side light source 3 increases.

While the preferred embodiments have been described above, the present disclosure is not limited to such embodiments. The content disclosed in the embodiments is merely an example and can be variously modified within the scope not departing from the gist of the present disclosure. Any modifications appropriately made within the scope not departing from the gist of the present disclosure also naturally belong to the technical scope of the present disclosure.

For example, while the first to the third embodiments have been described on the assumption that the switching element Tr has a bottom-gate structure, the switching element Tr is not limited to the bottom-gate structure, and may have a top-gate structure as another modification, as described above. If the switching element Tr has the top-gate structure, referring to the insulating film stacking structure of FIG. 14, the structure is such that the semiconductor layer SC is disposed between the first light-transmitting base 19 and the first insulating layer, the gate electrode GE is disposed between the first insulating layer 11 and the second insulating layer 12, and the source electrode SE and the contact electrode DEA are formed between the second insulating layer 12 and the third insulating layer 13.

In addition, as another modification, a direct-current voltage may be supplied as the common potential. In other words, the common potential may be constant. Alternatively, an alternating-current voltage may be shared as the common potential. In other words, the common potential may have two values of an upper limit value and a lower limit value. Whether the common potential is a direct-current potential or an alternating-current potential, the common potential is supplied to the holding capacitance electrode IO and the common electrode CE.

As the third insulating layer 13 of the second embodiment serving as a grid-shaped organic insulating film illustrated in FIGS. 20 and 21, the structure is disclosed in which the third insulating layer 13 inside the grid-shaped region is completely removed, and the second insulating layer 12 and the holding capacitance electrode IO in the lower layers are exposed. However, the present disclosure is not limited to this structure. For example, as another modification, the structure may be such that the third insulating layer 13 partially has a thin film remained in a portion inside the grid-shaped region surrounded by the signal lines SL and the scanning lines GL using a halftone exposure technique. With this structure, the film thickness of the third insulating layer 13 inside the grid-shaped region is less than the film thickness of the grid-shaped region surrounded by the signal lines SL and the scanning lines GL.

What is claimed is:
1. A display device comprising:
   a plurality of pixels
   an array substrate comprising a plurality of first light-transmitting electrodes each disposed in a corresponding one of the pixels;
   a counter substrate comprising positions that overlap the first light-transmitting electrodes in a plan view and are provided with a second light-transmitting electrode;
   a liquid crystal layer comprising polymer-dispersed liquid crystals filled between the array substrate and the counter substrate; and
   at least one light source configured to emit light toward a side surface of the counter substrate, wherein
   the array substrate comprises, in each of the pixels, a third light-transmitting electrode that at least partially overlaps the first light-transmitting electrode in the plan view with an insulating layer interposed between the first light-transmitting electrode and the third light-transmitting electrode,
   the third light-transmitting electrode has a grid shape that covers over a plurality of scanning lines and a plurality of signal lines along the signal lines and the scanning lines, and
   an area of the third light-transmitting electrode, which covers over the scanning lines and the signal lines in one of the pixels in a display region closer to the light source, is larger than an area of the third light-transmitting electrode, which covers over the scanning lines and the signal lines in one of the pixels in the display region farther from the light source.

2. The display device according to claim 1, wherein a common voltage is applied to the second light-transmitting electrode and the third light-transmitting electrode.

3. The display device according to claim 1, wherein the third light-transmitting electrode is provided across the pixels.

4. The display device according to claim 1, further comprising a conductive metal layer stacked with the third light-transmitting electrode having the grid shape.

5. The display device according to claim 4, wherein
   one surface of the array substrate is provided with the signal lines arranged in a first direction with spaces between the signal lines and the scanning lines arranged in a second direction with spaces between the scanning lines, and
   the metal layer overlaps the signal lines and the scanning lines in the plan view and is disposed in a grid shape.

6. The display device according to claim 5, wherein, in the plan view, a width of the metal layer overlapping each of the signal lines is greater than a width of one of the signal lines, and a width of the metal layer overlapping each of the scanning lines is greater than a width of one of the scanning lines.

7. The display device according to claim 6, wherein
   the array substrate further comprises light-blocking layers, each light-blocking layer extends along a corresponding one of the signal lines, overlaps a portion of the one of the signal lines in the plan view, and is provided opposite to the metal layer with the one of the signal lines therebetween,
   the light-blocking layers are made of a same material as the scanning lines, and a width of one of the light-blocking layers is greater than the width of the one of the signal lines and is less than the width of the metal layer.

8. The display device according to claim 5, wherein a switching element is provided in a region surrounded by the scanning lines and the signal lines, at least the switching element is covered with an organic insulating layer, and the metal layer having a larger area than that of the switching element is located on or above the organic insulating layer.

9. The display device according to claim 8, wherein a region surrounded by the scanning lines and the signal lines of the array substrate includes a region where a thickness of the organic insulating layer is less than a thickness of the organic insulating layer overlapping the scanning lines and the signal lines in the plan view.

10. The display device according to claim 5, wherein the array substrate further comprises a grid-shaped organic insulating layer that covers over the scanning lines and the signal lines along the scanning lines and the signal lines.

11. The display device according to claim 10, wherein the first light-transmitting electrodes are located above slant surfaces of the grid-shaped organic insulating layer covering over the scanning lines and the signal lines, the first light-transmitting electrodes overlap the third light-transmitting electrode having the grid shape, at the slant surfaces of the grid-shaped organic insulating layer.

12. The display device according to claim 5, wherein the third light-transmitting electrode has a region that includes no light-transmitting conductive material and that is surrounded by the scanning lines and the signal lines, and the region is larger as the display region is farther from the light source.

* * * * *